(12) United States Patent
Xu et al.

(10) Patent No.: US 12,366,455 B2
(45) Date of Patent: *Jul. 22, 2025

(54) ROUTE DEVIATION QUANTIFICATION AND VEHICULAR ROUTE LEARNING BASED THEREON

(71) Applicant: GRABTAXI HOLDINGS PTE. LTD., Singapore (SG)

(72) Inventors: Nuo Xu, Singapore (SG); Xiaocheng Huang, Singapore (SG); Lei Yuan, Singapore (SG); Gaurav Bubna, Singapore (SG); Zehua Wang, Singapore (SG)

(73) Assignee: GRABTAXI HOLDINGS PTE. LTD., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/461,758

(22) Filed: Sep. 6, 2023

(65) Prior Publication Data

US 2024/0142242 A1 May 2, 2024

Related U.S. Application Data

(63) Continuation of application No. 17/754,011, filed as application No. PCT/SG2020/050295 on May 19, 2020, now Pat. No. 11,788,850.

(51) Int. Cl.
*G01C 21/34* (2006.01)
*G01C 21/36* (2006.01)

(52) U.S. Cl.
CPC ..... *G01C 21/3415* (2013.01); *G01C 21/3446* (2013.01); *G01C 21/3492* (2013.01); *G01C 21/3617* (2013.01)

(58) Field of Classification Search
CPC ............ G01C 21/3415; G01C 21/3446; G01C 21/3492; G01C 21/3617; G01C 21/3484; G06Q 50/30; G06Q 10/047
See application file for complete search history.

(56) References Cited

U.S. PATENT DOCUMENTS

| | | | |
|---|---|---|---|
| 2010/0191455 A1 | 7/2010 | Sugawara et al. | |
| 2011/0208429 A1* | 8/2011 | Zheng ............... | G01C 21/3484 707/E17.089 |

(Continued)

FOREIGN PATENT DOCUMENTS

| | | |
|---|---|---|
| CN | 106465056 | 2/2017 |
| CN | 106919993 A | 7/2017 |

(Continued)

OTHER PUBLICATIONS

Information Disclosure Statement dated Mar. 21, 2022 which was filed in connection with U.S. Appl. No. 17/754,011.

(Continued)

*Primary Examiner* — Rami Khatib
(74) *Attorney, Agent, or Firm* — Buckley, Maschoff & Talwalkar LLC

(57) ABSTRACT

The present disclosure provides methods, devices and systems for route deviation quantification and vehicular route learning based thereon. In some examples, there is provided a method for route deviation quantification of a suggested route. The method comprises: obtaining a ground truth route based on a filtered trajectory, the filtered trajectory including an inferred location of origin and an inferred location of destination; obtaining a suggested route generated based on the inferred location of origin and the inferred location of destination; quantifying a deviation of the suggested route from the ground truth route by calculating an off course ratio based on a combined length of road segments in the suggested route that are matched to corresponding road seg- (Continued)

ments in the ground truth route and a combined length of road segments in the ground truth route.

23 Claims, 15 Drawing Sheets

(56) References Cited

U.S. PATENT DOCUMENTS

| | | | |
|---|---|---|---|
| 2018/0003516 A1* | 1/2018 | Khasis | G08G 1/207 |
| 2019/0204088 A1* | 7/2019 | Haque | G06N 3/02 |
| 2020/0234582 A1 | 7/2020 | Mintz | |

FOREIGN PATENT DOCUMENTS

| | | |
|---|---|---|
| CN | 106969782 | 7/2017 |
| CN | 108303108 A | 7/2018 |
| CN | 109429506 A | 3/2019 |
| CN | 110647693 A | 1/2020 |
| DE | 102019000617 | 6/2019 |
| JP | 2009036702 | 2/2009 |
| KR | 101843683 | 3/2016 |
| WO | 2021236006 A1 | 11/2021 |

OTHER PUBLICATIONS

Chen et al., "Path planning strategy for vehicle navigation based on user habits", Applied Sciences 8.3 (2018): 407.
Dai et al., "Personalized route recommendation using big trajectory data", 2015 IEEE 31st international conference on data engineering. Apr. 17, 2015.
Letchner et al., "Trip router with individualized preferences (trip): Incorporating personalization into route planning", AAAI. 2006, vol. 2, pp. 1795-1800.
International Application No. PCT/SG2020/050295, International Search Report and Written Opinion, mailed Aug. 3, 2020.
892 Form dated Feb. 2, 2023 with was received in connection with U.S. Appl. No. 17/754,011.
Information Disclosure Statement dated Feb. 15, 2023 which was filed in connection with U.S. Appl. No. 17/754,011.
Chinese Application No. 202080068085.0, "Office Action", mailed on Jun. 22, 2022, 15 pages.
Chinese Application No. 202080068085.0, "Office Action", mailed on Nov. 23, 2022, 10 pages.
Notice of Allowance dated Jun. 23, 2023 which was received in connection with U.S. Appl. No. 17/754,011.

* cited by examiner

Algorithm 1: SequentialOverlap

Input: $\hat{P}, P$
Output: Length of Overlap

1  $i, j \leftarrow 0$ // match $\hat{P}(i)$ with $P(j)$ starting with the first element
2  $match \leftarrow 0$ // length of match
3  while $i < size(\hat{P})$ and $j < size(P)$ do
4      // find the first appearance of $P(j)$ in $\hat{P}$ with index no smaller than $i$
5      $m \leftarrow FirstMatch(\hat{P}, i, P(j))$
6      if $m >= i$ then
7          $match \leftarrow match + len(P(j))$
8          $i \leftarrow m + 1$
9      $j \leftarrow j + 1$
10  return $match$

Figure 6

Algorithm 2: Two-step Tuning Framework

Input: training data $D$, map, speed profile
Output: optimised speed profile

```
   // iterate each (road class r, speed s) pair in speed profile
 1 for (r, s) in speed profile do
       // first iteration to find initial value of s
 2     s* ← s_MIN
 3     ratio, s ← CalcRatioAndCompare(D, speed profile, map)
       // first step speed tuning with large step
 4     while s* < s_MAX do
 5         UpdateSpeedProfile(r, s*)
 6         ratio, s ← CalcRatioAndCompare(D, speed profile, map)
 7         s* ← s* + step₁
       // second step speed tuning with small step
 8     s* ← s − Δ
 9     while s* < s + Δ do
10         UpdateSpeedProfile(r, s*)
11         ratio, s ← CalcRatioAndCompare(D, speed profile, map)
12         s* ← s* + step₂
13     UpdateSpeedProfile(r, s)
```

Figure 11

ROUTE DEVIATION QUANTIFICATION AND VEHICULAR ROUTE LEARNING BASED THEREON

The present invention is non-provisional continuation claiming priority to non-provisional application U.S. Ser. No. 17/754,011 which was filed on Mar. 21, 2022, and is entitled: "ROUTE DEVIATION QUANTIFICATION AND VEHICULAR ROUTE LEARNING BASED THEREON" which is a 371 of International Application No. PCT/SG2020/050295, filed on May 19, 2020, incorporated by reference herein in its entirety.

FIELD OF INVENTION

The present disclosure relates broadly, but not exclusively, to methods, devices and systems for route deviation quantification and vehicular route learning based thereon.

BACKGROUND

Vehicular routing is of fundamental importance in ride-hailing industry for location-based services such as estimated time of arrival (ETA), pricing, navigation, nearest driver search, etc. Accurate route planning is a key factor in providing excellent transportation experience to customers by avoiding additional cost (e.g., tolls and Electronic Road Pricing (ERP), heavy traffic and road restrictions.

Traditional vehicle routing is cost-centric and aims at finding routes with minimal costs (e.g., via shortest distance or shortest travel time). Shortest path algorithms, e.g. Dijkstra's algorithm and contraction hierarchies, are used to suggest fastest or shortest routes in traditional vehicle routing.

However, in real life cases, drivers often choose routes which are often neither fastest nor shortest and differ substantially from those suggested fastest or shortest routes. The deviation between drivers' actual routes and vehicle routing suggested fastest or shortest routes can be caused by various factors, such as tell avoidance, road conditions, or even personal reasons.

Current vehicle routing methods attempt to minimise the deviation by learning drivers' trajectory data that capture movements of vehicles to optimise cost on each edge or road segment in road networks so as to suggest shortest routes that are as close as drivers' actual routes.

However, multiple challenges exist in the current vehicle routing methods, which include: a. how to quantify the deviation between vehicle routing suggested routes and drivers' actual routes in order to minimise the deviation for improving routing results; b. how to efficiently and effectively learn drivers' raw trajectory data, which is of great volume and can be noisy, for improving routing results; and c. how to improve the routing such that it works well in different countries or geographical regions despite hyper-local situations (e.g., in southeast Asia, traffic rules, road conditions and regulations vary significantly in each country).

A need therefore exists to provide methods and devices that seek to overcome or at least minimize the above mentioned challenges and provide accurate route planning.

SUMMARY

According to a first aspect of the present disclosure, there is provided a method for route deviation quantification of a suggested route. The method comprises: obtaining a ground truth route based on a filtered trajectory, the filtered trajectory including an inferred location of origin and an inferred location of destination; obtaining a suggested route generated based on the inferred location of origin and the inferred location of destination; quantifying a deviation of the suggested route from the ground truth route by calculating an offcourse ratio based on a combined length of road segments in the suggested route that are matched to corresponding road segments in the ground truth route and a combined length of road segments in the ground truth route.

According to a second aspect of the present disclosure, there is provided a device for route deviation quantification of a suggested route. The device comprises a processor module and a memory module including computer program code. The memory module and the computer program code are configured to, with the processor module, cause the device to: obtain a ground truth route based on a filtered trajectory, the filtered trajectory including an inferred location of origin and an inferred location of destination; obtain a suggested route generated based on the inferred location of origin and the inferred location of destination; and quantify a deviation of the suggested route from the ground truth route by calculating an offcourse ratio based on a combined length of road segments in the suggested route that are matched to corresponding road segments in the ground truth route and a combined length of road segments in the ground truth route.

According to a third aspect of the present disclosure, there is provided a method for vehicular route learning. The method comprises: retrieving a training data set corresponding to historical trajectories on a map; optimising a speed profile of the map to achieve a minimised average offcourse ratio for the training data set; and updating the speed profile for the map.

According to a fourth aspect of the present disclosure, there is provided a system for vehicular route learning. The system comprises a processor module and a memory module including computer program code. The memory module and the computer program code are configured to, with the processor module, cause the system to: retrieve a training data set corresponding to historical trajectories on a map; optimise a speed profile of the map to achieve a minimised average offcourse ratio for the training data set; and update the speed profile for the map.

BRIEF DESCRIPTION OF THE DRAWINGS

Embodiments and implementations are provided by way of example only, and will be better understood and readily apparent to one of ordinary skill in the art from the following written description, read in conjunction with the drawings, in which:

FIG. 6 shows an exemplary method for computing a combined length of road segments in a suggested route that are matched to road segments in a ground truth route, which is presented in the form of an algorithm, according to an embodiment. This exemplary method can be used in step 412 of the exemplified method 400 for route deviation quantification as shown in FIG. 4.

FIG. 11 shows an exemplary method for optimising speed for each road class in the map, which is presented in the form of an algorithm, according to an embodiment. This method includes sub-steps that can be used in step 904 of the exemplified method 900 for vehicular route learning, as shown in FIG. 9.

Figure 1:
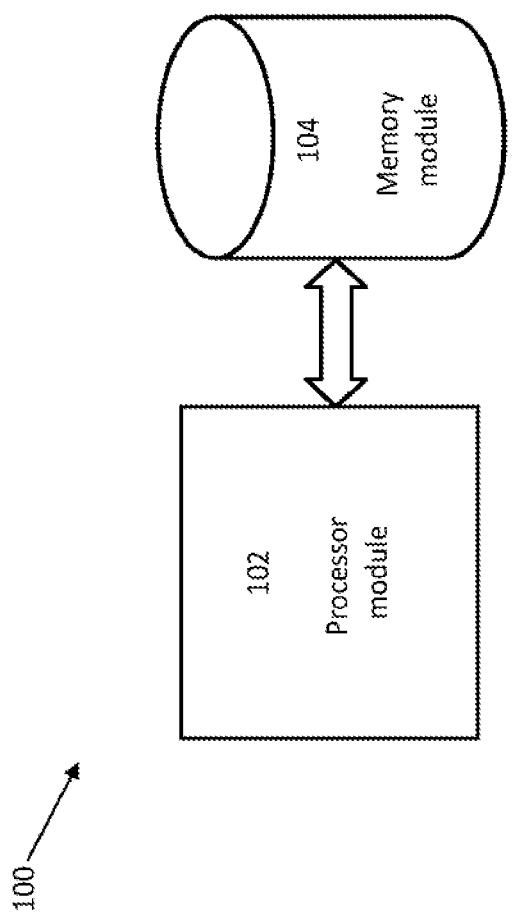
FIG. 1 is a schematic diagram of a computing device. The computing device can be implemented as a device for route deviation quantification or a system for vehicular route learning, according to embodiments of the present application.

Skilled artisans will appreciate that elements in the figures are illustrated for simplicity and clarity and have not necessarily been depicted to scale. For example, the dimensions of some of the elements in the illustrations, block diagrams or flowcharts may be exaggerated in respect to other elements to help to improve understanding of the present embodiments.

DETAILED DESCRIPTION

Embodiments will be described, by way of example only, with reference to the drawings. Like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "extracting", "preprocessing", "converting", "building", "providing", "generating", "quantifying", "calculating", "outputting", "optimising", "rebuilding", "storing", "mapping", "checking", "identifying", "stitching", "searching", "conducting", "starting", "aggregating", "determining", "regenerating", "updating", "comparing", "adjusting", "recalculating", "partitioning", "obtaining" or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer suitable for executing the various methods/processes described herein will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the scope of the specification.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a computer effectively results in an apparatus that implements the steps of the preferred method.

A road network is a weighted graph representation of a map. The road network can be represented as G=(V, E, W), which comprises: a vertex set V including a plurality of nodes v in the graph; an edge set E⊆V×V including a plurality of road segments, each road segment being represented by a start node and an end node with a direction; and a weight function W which maps each road segment to a duration. In the present application, a road segment is interchangeably referred as an edge.

The metadata of the road network, including node attributes (node location, etc) and road segment attributes (segment distance, road class of each segment, etc) and topology information, is stored in the map. The road network may include further information, such as turn restrictions, oneways, etc. For the sake of simplicity, the further information of the road network is not discussed in the present application.

A route plan, which is interchangeably referred as "route" in the present application, can be represented as $P=<v_1, v_2, \ldots, v_k>$, which is a sequence of nodes in which every two consecutive nodes are connected by an edge (i.e. road segment). A route can also be represented as $P=<e_1, e_2, \ldots, e_k>$, which is a sequence of road segments each being represented by a start node and an end node, wherein for every two consecutive segments $e_i=(o_i,d_i)$ and $e_{i+1}=(o_{i+1},d_{i+1})$, $d_i=o_{i+1}$. That is, in every two consecutive road segments, the end node of a first road segment is the start node of a second road segment.

A trajectory is a time-ordered sequence of Global Positioning System (GPS) pings capturing movement of a vehicle, where a GPS ping is represented as a triplet (ts, lat, lon) indicating a location (composed as latitude lat and longitude lon) of the vehicle at a timestamp ts. In GPS systems, the distance between two locations is a haversine distance, i.e. angular distance. The time gap between two consecutive pings is usually around one second.

A map has a speed profile that includes a collection of speeds each corresponding to a road class on the map. In Open Street Map, each road segment contains road class information which identifies the type of the road (e.g., motorway, primary road, secondary road, etc). The weight (duration) of each road segment can be easily derived from distance (i.e. the length between a start node and an end node of a road segment) and speed (i.e. which can be obtained from a speed profile based on the road class a road segment belongs to). Since the distance of each road segment is known in each map, a road network, i.e. a weighted graph representation of a map, can be built on a map and its speed profile.

In the present application, embodiments are provided with regards to a routing metric, i.e. route deviation quantification, to quantify a difference between a route suggested by a route engine module and an actual route taken by a driver so as to evaluate performance of the route suggestion. It is appreciable to those skilled in the art that other types of routing metrics, e.g. cost, delay, etc., can also be used to quantify differences between a route suggested by the routing service and an actual route taken by a driver.

FIG. 1 illustrates a schematic diagram of a computing device 100. The device 100 can be implemented as a device for route deviation quantification or a system for vehicular route learning as discussed herein, according to embodiments of the present application.

The device 100 at least includes a processor 102 and a memory 104. The processor 102 and the memory 104 are interconnected. The memory 104 includes computer program code (not shown in FIG. 1). The memory 104 and the computer program code are configured to, with the processor 102, cause the device 100 to perform the steps for route deviation quantification or the steps for vehicular route learning as described in the following paragraphs of the present disclosure.

Details of the steps for route deviation quantification will be described below with reference to FIG. 4, which depicts a flow chart illustrating a method 400 for route deviation quantification according to an embodiment. Details of the steps for vehicular route learning will be described below with reference to FIG. 9, which depicts a flow chart illustrating a method 900 for vehicular route learning according to an embodiment.

Figure 2:
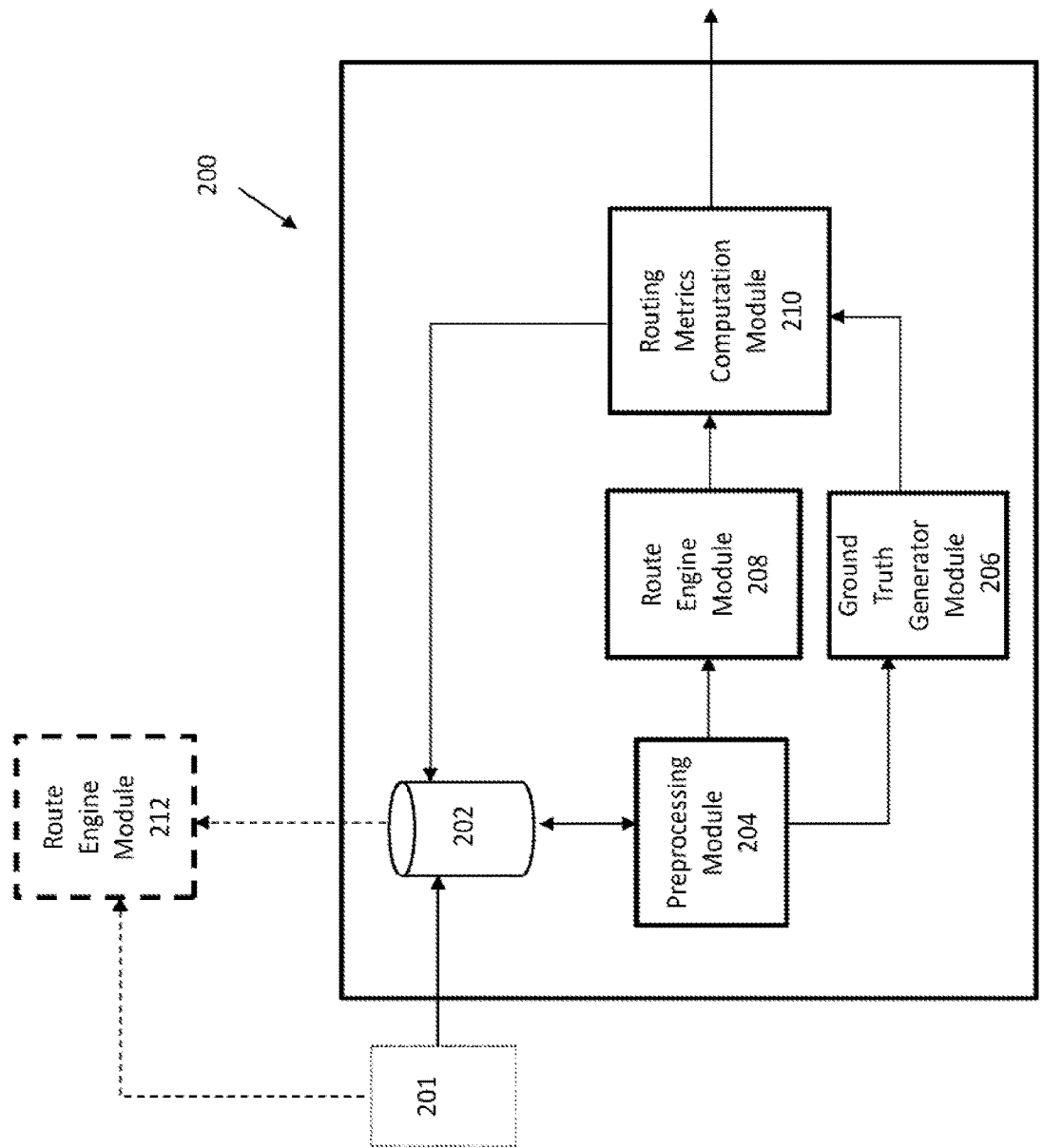
FIG. 2 is a schematic diagram of a device for route deviation quantification, according to an embodiment.

FIG. 2 depicts a schematic diagram of a device 200 for route deviation quantification of a suggested route, according to an embodiment. In this embodiment, the device 200 includes a preprocessing module 204, a ground truth generator module 206, a route engine module 208 and a routing metrics computation module 210.

Figure 4:
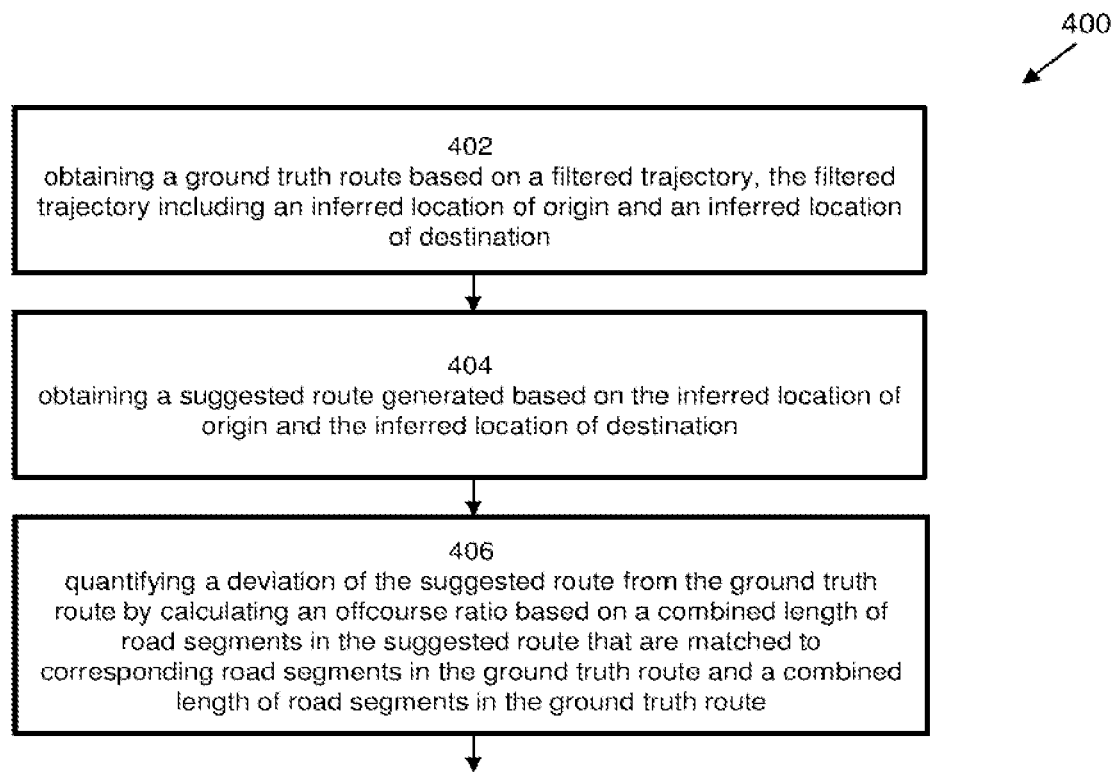
FIG. 4 is a flow chart illustrating a method for route deviation quantification, according to an embodiment.

As shown in the exemplified method 400 for route deviation quantification in FIG. 4, the device 200 for route deviation quantification, as well as the device 100 when implemented as a device 100 for route deviation quantification, are configured to perform the following steps:

Step 402: obtaining a ground truth route based on a filtered trajectory, the filtered trajectory including an inferred location of origin and an inferred location of destination;

Step 404: obtaining a suggested route generated based on the inferred location of origin and the inferred location of destination; and Step 406: quantifying a deviation of the suggested route from the ground truth route by calculating an offcourse ratio based on a combined length of road segments in the suggested route that are matched to corresponding road segments in the ground truth route and a combined length of road segments in the ground truth route.

At step 402, the routing metrics computation module 210 obtains a ground truth route based on a filtered trajectory. The filtered trajectory includes an inferred location of origin and an inferred location of destination. In some embodiments, the ground truth route is obtained from the preprocessing module 204, and step 402 includes the following sub-steps:

Step 402A: extracting historical data comprising raw GPS data of a historical trajectory on a map;

Step 402B: preprocessing the raw GPS data of the historical trajectory to obtain the filtered trajectory with the inferred location of origin and the inferred location of destination, wherein the filtered trajectory comprises a time-ordered sequence of GPS pings, and wherein each of the GPS pings indicates a location of a vehicle at a timestamp during the filtered trajectory; and Step 402C: converting the time-ordered sequence of GPS pings to the ground truth route At sub-step 402A, the preprocessing module 204 extracts historical data comprising raw GPS data of a historical trajectory on a map. The map can be a map of a city, such as Singapore, Bangkok, Kuala Lumpur, etc., or a map of a district of such a city, e.g. Central Business District (CBD) area of Singapore, etc.

The historical data includes raw GPS data of historical trajectories captured by an acquisition module 201 of the device 200 and stored in a database module 202 of the device 200. The acquisition module 201 may be a communication module in the device 200. Each historical trajectory in the historical data represents a trip that a driver has taken at a time of a day. The historical data can include historical trajectories that represent a considerable number of trips that a plurality of drivers have taken during a day, a week, a month, a year, or any pre-determined interval.

In some embodiments, the historical data can include raw GPS data of historical trajectories captured during a pre-determined period of time. The pre-determined period of time can be, e.g. 8 AM to 9 AM every day in a predetermined month, or 5 PM to 6 PM every Friday in a predetermined year. It is up to the practical needs to design such a predetermined period of time for sampling sufficient data.

The raw GPS data of the historical trajectories indicates locations of origin, locations of destination, and actual routes that the drivers took during the trips. However, as mentioned above, such raw GPS data is usually of great volume and requires preprocessing to obtain ground truth routes for comparison with suggested routes generated by the route engine module 208 to quantify inaccuracy (i.e. deviation) of the suggested routes. The pre-processing of the raw GPS data is conducted in Step 402B, which will be described in detail in the following paragraphs.

In the present embodiments, one historical trajectory is extracted at step 402A. In some other embodiments, a batch of historical trajectories can be extracted in a similar manner, in which each historical trajectory is extracted and processed independently according to steps 402B-402C and steps 404 to 406.

At step 402B, the preprocessing module 204 preprocesses the raw GPS data of the historical trajectory to obtain a filtered trajectory with an inferred location of origin and an inferred location of destination. The filtered trajectory comprises a time-ordered sequence of GPS pings, and wherein each of the GPS pings indicates a location of a vehicle at a timestamp during the filtered trajectory.

Figure 5:
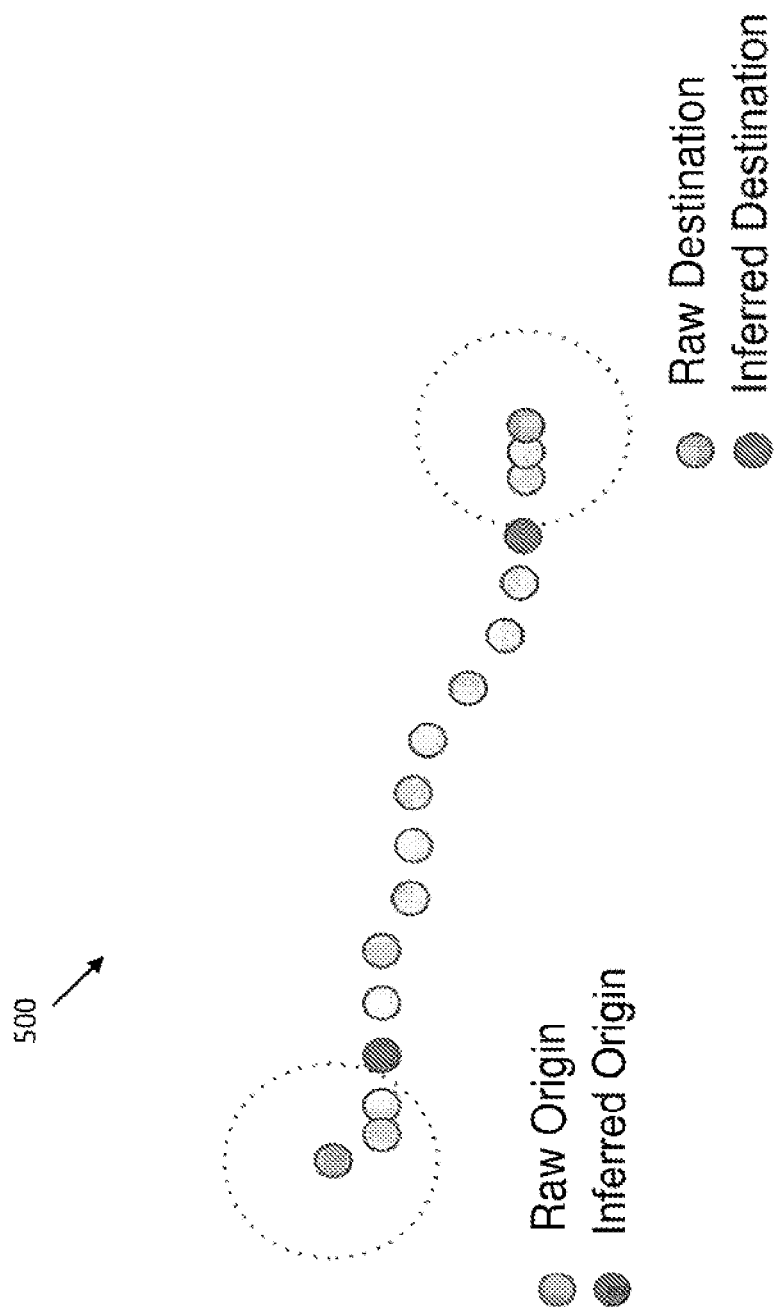
FIG. 5 is an exemplary diagram showing raw GPS data and pre-processed GPS data, according to an embodiment. The pre-processed GPS data can be used in a routing-metric computation module to evaluate suggested routes suggested by a route engine module as shown in FIG. 2. The evaluation result produced by the routing-metric computation module can further be used for downstream applications, e.g. vehicular route learning.

An exemplary diagram showing the step 402B of preprocessing the raw GPS data to obtain the filtered trajectory is depicted in FIG. 5. In some embodiments, during the pre-processing, the raw GPS data can be first processed to remove duplicate GPS pings and rearranged to become time-ordered. Additionally, as the raw GPS pings are usually very noisy when a driver is close to a location of origin and a location of destination due to slow speed around these areas, the present application advantageously addresses this technical problem by filtering GPS pings of the historical trajectory from the location of origin until a distance to the location of origin is larger than a threshold. In this manner, as shown in FIG. 5, the GPS pings near the location of origin are filtered, and a location of a first GPS ping that lies outside a threshold radius is obtained as an inferred location of origin. Likewise, the GPS pings near the location of destination are filtered and an inferred location of destination is obtained.

As shown in FIG. 5, by virtue of the preprocessing of the raw GPS data at step 402B, the preprocessing module 204 obtains a filtered trajectory with an inferred location of origin and an inferred location of destination. To differentiate the location of origin before and after pre-processing in FIG. 5, the original location of origin is labelled as raw origin and the inferred location of origin is labelled as inferred origin. Similarly, the original location of destination is labelled as raw destination and the inferred location of destination is labelled as inferred destination in FIG. 5.

As described above, the pre-processed GPS data, i.e. the filtered trajectory with the inferred location of origin and the inferred location of destination, can be used in the routing-metric computation module 210 to evaluate suggested routes suggested by the route engine module 208. The evaluation result produced by the routing-metric computation module 210 can further be used for downstream applications, e.g. vehicular route learning.

The filtered trajectory comprises a time-ordered sequence of GPS pings and each of the GPS pings indicates a location of a vehicle at a timestamp during the filtered trajectory. Such a time-ordered sequence of GPS pings is indicative of the vehicle's actual route. Such a vehicle's actual route is referred as a ground truth route. At step 402C, the ground truth generator module 206 converts the time-ordered sequence of GPS pings to a ground truth route.

In some embodiments, when converting the time-ordered sequence of GPS pings at step 402C, the ground truth generator module 206 maps the time-ordered sequence of GPS pings to most similar road segments on the map. The mapped most similar road segments forms a sequence of nodes in the map. In this manner, the time-ordered sequence of GPS pings is mapped to a sequence of nodes in the map.

During the mapping of the time-ordered sequence of GPS pings, each GPS ping can be mapped into several candidate road segments through R-tree. Thereafter, a process is conducted to find most similar road segments for the sequence of GPS pings through a hidden Markov model.

Figure 3:
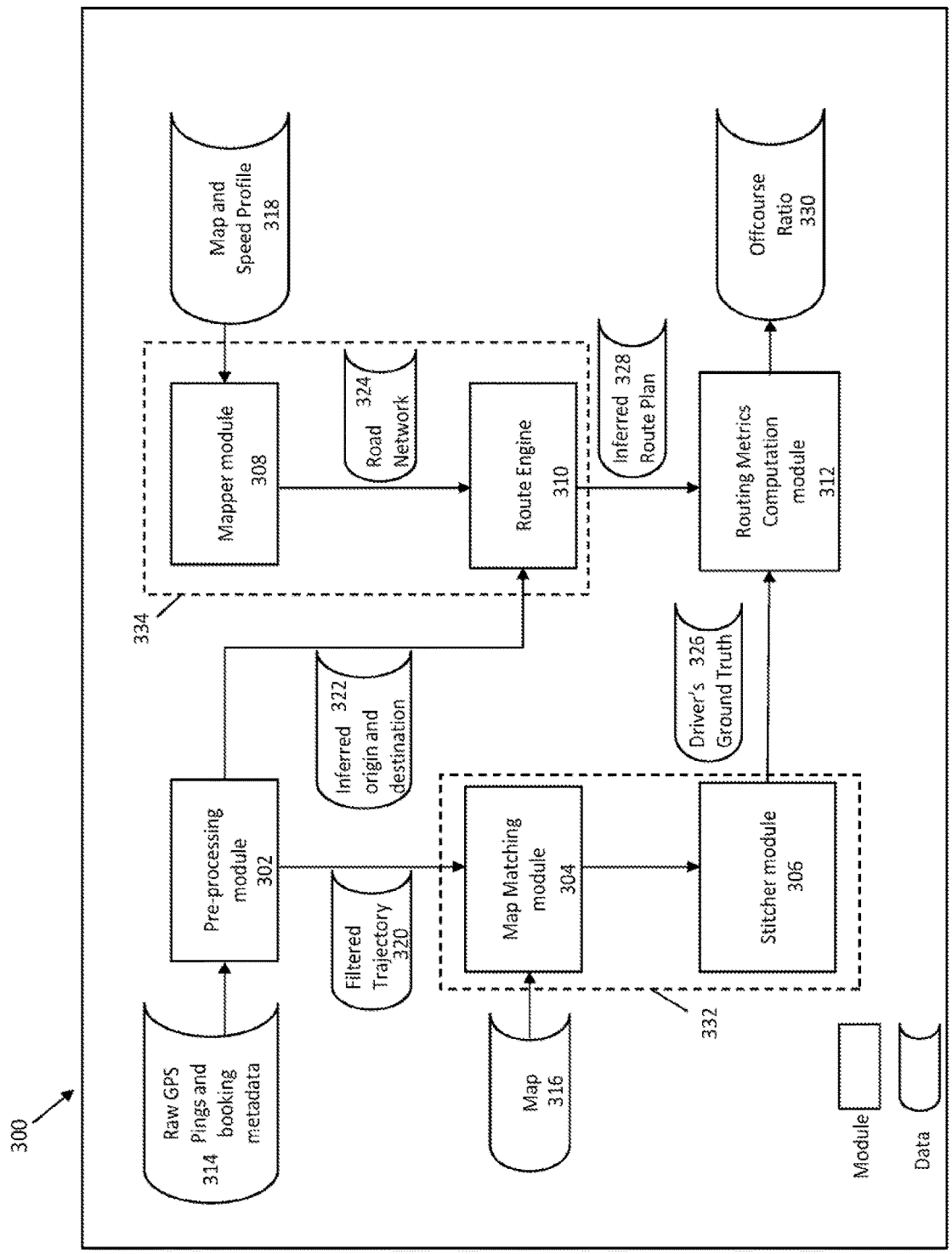
FIG. 3 is a block diagram of a device for route deviation quantification module, according to another embodiment.

In some alternative embodiments, the ground truth generator module 206 may include a map matching module that is configured to map the time-ordered sequence of GPS pings to a sequence of nodes in the map as described above. An example of the map matching module is depicted in FIG. 3.

In some embodiments, the mapped sequence of nodes in the map may include certain consecutive nodes that are only routable but are not directly connected in the map. To increase connectivity of the sequence of nodes, the step 402C of converting the time-ordered sequence of GPS pings to a ground truth route can further requires the ground truth generator module 206 to check connectivity of every two consecutive nodes in the sequence of nodes. If there are two consecutive nodes in the sequence of nodes which are not connected in the map, the ground truth generator module 206 can identify a path, which includes two or more nodes, interconnecting the two consecutive nodes in the map, and stitch the two consecutive nodes by inserting the two or more nodes between the two consecutive nodes.

In some alternative embodiments, the ground truth generator module 206 may include a stitcher module that is configured to check connectivity of every two consecutive nodes in the sequence of nodes, and if there are two consecutive nodes in the sequence of nodes which are not connected in the map, identify a path which includes two or more nodes interconnecting the two consecutive nodes in the map, and stitch the two consecutive nodes by inserting the two or more nodes between the two consecutive nodes. An example of the stitcher module is depicted in FIG. 3.

In some examples, the ground truth generator module 206 or the stitcher module may identify the path by finding one and only one route between two disconnected consecutive nodes, e.g. from node a to node b, either in an original map or in a simplified map which treats certain group of nodes (such as junctions) as one node. In either of the maps, the ground truth generator module 206 or the stitcher module inserts nodes along the one and only one route into the gap between node a and node b to make sure the node sequence from node a to node b becomes fully connected.

Experimental data of the present application shows that the connectivity of the mapped sequence of nodes can be significantly boosted after the steps described above for increasing connectivity by stitching disconnected consecutive nodes at the ground truth generator module 206 or the stitcher module. For example, for historical trajectories captured over one day, connectivity of over 30% of total node sequences converted from preprocessed historical trajectories can be improved by the stitching. Ground truth routes formed by such processed node sequences can in turn facilitate accurate evaluation for improving the routing.

In view of the above, after stitching certain disconnected consecutive nodes in the mapped sequence of nodes, the stitched mapped sequence of nodes forms a ground truth route. It is appreciable to those skilled in the art that in some other embodiments, the mapped sequence of nodes may form a ground truth route without stitching.

At step 404, routing metrics computation module 210 obtains a suggested route generated based on the inferred location of origin and the inferred location of destination. In some embodiments, the suggested route is obtained from the route engine module 208, and the step 404 comprises the following sub-steps:

Step 404A: building a road network based on the map and a speed profile of the map, the speed profile comprising a collection of speeds, each speed corresponding to a road class in the map; and Step 404B: generating the suggested route based on the road network, the inferred location of origin and the inferred location of destination.

At step 404A, the route engine module 208 builds a road network based on the map and a speed profile of the map. As described above, the speed profile comprises a collection of speeds each of which is corresponding to a road class in the map.

In some embodiments, the map may include 12 or 15 road classes. In this respect, the speed profile may comprise a collection of 12 or 15 speeds each corresponding to a respective road class in the map.

In some embodiments, when budding the road network at step 404C, the weight of each road segment in the road network is the duration of each road segment and is inferred based on the map and the speed profile along with an auxiliary data structure in support of different queries (e.g., R-tree is generated to support nearest road segment query).

In some embodiments, the route engine module 208 may include a mapper module that is configured to build a road network as described above. An example of the mapper module is depicted in FIG. 3.

At step 404B, the route engine module 208 generates a suggested route based on the road network, the inferred location of origin, and the inferred location of destination.

In some embodiments, the step 404B includes a sub-step at which the route engine module 208 matches the inferred location of origin and the inferred location of destination to nearest road segment as an origin road segment and a destination segment. Such a matching is similar to the mapping from the time-ordered sequence of GPS pings to the sequence of nodes as described in step 402C. In some examples, the route engine module 208 may include a mapper module that is configured to conduct the matching. An example of the mapper module is depicted in FIG. 3.

Thereafter, the step 404B includes another sub-step at which the route engine module 208 produces a suggested route connecting the origin segment and the destination segment with a shortest weight (duration). Various algorithms can be used for computing a single source shortest path, such as Dijkstra's algorithm or A* search. The present route engine module 208 uses a contraction hierarchies algorithm for its ability to handle millions of shortest path queries efficiently after the preprocessing at step 402B.

In the present application, the above described step 402C that converts the time-ordered sequence of GPS pings to a ground truth route can take place either prior to, in parallel with, or after the steps 404A and 404B for building a road network and generating a suggested route based on the road network and inferred locations of origin and destination.

At step 406, the routing metrics computation module 210 quantifies a deviation of the suggested route from the ground truth route by calculating an offcourse ratio based on a combined length of road segments in the suggested route that are matched to corresponding road segments in the ground truth route and a combined length of road segments in the ground truth route.

In some embodiments, when calculating the offcourse ratio at step 406, the routing metrics computation module 210 is configured to compute the following equation:

$$\text{OffcourseRatio}(\hat{P},P)=1-\text{Sim}(\hat{P},P), \quad (1)$$

wherein P is the suggested route, $\hat{P}$ is the ground truth route, and $\text{Sim}(\hat{P},P)$ is a similarity score bet n the suggested route and the ground truth route.

In some embodiments, the similarity score $\text{Sim}(\hat{P},P)$ can be computed based on the following equation:

$$Sim(\hat{P}, P) = \frac{SequentialOverlap(\hat{P}, P)}{\sum_{\hat{e} \in \hat{P}} len(\hat{e})}, \quad (2)$$

wherein $\hat{e}$ denotes each road segment in the ground truth route, $len(\hat{e})$ denotes each road segment's length in the ground truth route, and $SequentialOverlap(\hat{P},P)$ is the combined length of road segments in the suggested route that are matched to the corresponding road segments in the ground truth route.

In some embodiments, the step 406 may include a sub-step for obtaining the combined length SequentialOverlap $(\hat{P},P)$ of road segments in the suggested route that are matched to the corresponding road segments in the ground truth route. At the substep of step 406, the routing metrics computation module 210 is configured to search for the road segments in the suggested route that are matched to the corresponding road segments in the ground truth route.

At the sub-step of searching for the road segments, the routing metrics computation module 210 sequentially conducts a search for a matching road segment in the for each road segment in the suggested route, wherein during each iteration of search, the routing metrics computation module 210 starts the search in the ground truth route from a road segment that is placed subsequent to a last matched road segment in the suggested route.

FIG. 6 shows an exemplary method 600 that can be used in the sub-step of step 406 for obtaining the combined length of road segments in the suggested route that are matched to road segments in the ground truth route. The exemplary method 600 is presented in the form of an algorithm.

As shown in FIG. 6, the method 600 receives the ground truth route and the suggested routes as inputs and produces a combined length of overlapped road segments as an output.

As shown in line 1 of FIG. 6, the method 600 starts searching for a matching road segment in the ground truth route for the first road segment of the suggested route. The searching starts from the first road segment in the ground truth route. The initial length of overlapped segments is set as 0, as shown in line 2 of FIG. 6.

As shown in lines 3 and 4 of FIG. 6, the method 600 iterates each road segment in the suggested route and searches for a matching road segment in the ground truth route.

If a road segment of the suggested route finds a matching road segment in the ground truth route as shown in line 5 of the method 600, the length of the road segment of the suggested route is added to the length of overlapped segments, as shown in line 6 of the method 600. In the next iteration as shown in line 7 of FIG. 6, the search starts from the next road segment in the ground truth route to make sure that the road segments in the suggested route and the ground truth route are sequentially matched.

If no matching road segment is found for the road segment of the suggested route, a function FirstMatch returns a negative index indicating no match and proceeds to a search for the next road segment of the suggested route, as shown in line 9 of FIG. 6.

The route deviation quantification as obtained in the embodiments of method and device as described above provides two-fold technical advantages: first, the offcourse ratio calculated by the route deviation quantification is more directly indicative of a difference between a suggested route and a ground truth route, as the more and longer road segments the suggested route shares with the ground truth route, the more similar the two routes are; second, the offcourse ratio calculated by the route deviation quantification is more accurate, as the obtaining of the combined length SequentialOverlap $(\hat{P},P)$ of road segments in the suggested route that are matched to road segments in the ground truth route is accurate. This is because the overlap of the suggested route and the ground truth route must be sequential as the sequences of road segments in the two routes are connected in a timely manner.

Furthermore, the route deviation quantification as obtained in the embodiments of method and device as described above provides flexibility for route deviation quantification. As shown in equations (1) and (2), a deviation between any two sequences of road segments can be calculated by the route deviation quantification of the present application, regardless of whether the two sequences of road segments are fully connected.

Based on the equation (1), the offcourse ratio calculated by the route deviation quantification falls between 0 and 1, wherein 0 means the two routes are completely the same, and 1 means the suggested route is completed deviated from the ground truth route. That is, the smaller the offcourse ratio is, the closer the suggested route is to the ground truth ratio. The offcourse ratio, as a value evaluating a deviation of a suggested route generated by the route engine module 208 compared to a ground truth route, can be subsequently used in downstream applications for improving the routing.

In some embodiments, the routing metrics computation module 210 can store the offcourse ratio to a database corresponding to the suggested route with the inferred location of origin and the inferred location of destination. The database can be the database module 202 of the device 200 or a database module 702 in a system 700 for vehicular route learning as described herein, or a database module 802 in a system 800 for vehicular route learning as described herein.

In some embodiments, if the offcourse ratio is not greater than a threshold value, the routing metrics computation module 210 can store the suggested route with the inferred location of origin and the inferred location of destination in the data module 202 of the device 200. In response to a routing request received at the acquisition module 201 with a location of origin corresponding to the inferred location of origin and a location of destination corresponding to the inferred location of destination, the device 200 may output the suggested route to a route engine module 212 for providing as a suggested route in response to the routing request. The threshold value can be pre-determined based on practical needs, e.g. 0.2.

In some embodiments, if the offcourse ratio is greater than a threshold value, the routing metrics computation module 210 can send the offcourse ratio to a downstream application, e.g. a system for vehicular route learning, for optimising the speed profile of the map to rebuild the road network for regenerating the suggested route to achieve a minimised offcourse ratio. Additionally or alternatively, vehicular route learning is an independent process which can be triggered on demand or in a batch depending on various requirements, instead of being triggered by an offcourse ratio greater than a threshold value.

FIG. 3 shows another embodiment of a device 300 for route deviation quantification module. Similar to the device 200 as shown in FIG. 2, the device 300 comprises a preprocessing module 302, a ground truth generator module 332, a route engine module 334 and a routing metrics computation module 312. As described above, the device 300 is configured to perform the steps shown in FIG. 4 and described above.

In the embodiment of the device 300, the ground truth generator module 332 includes two sub-modules: a map matching module 304 and a stitcher module 306.

In the embodiment of the device 300, the route engine module 334 includes two sub-modules: a mapper module 308 and a route engine 310.

At step 402, the routing metrics computation module 312 is configured to obtain a ground truth route based on a filtered trajectory. The filtered trajectory includes an inferred location of origin and an inferred location of destination. In some embodiments, the ground truth route is obtained from the ground truth generator module 332.

At a sub-step of step 402, the map matching module 304 maps the time-ordered sequence of GPS pings to a sequence of nodes in the map as described above with respect to FIG. 4.

At another sub-step of step 402, the stitcher module 306 checks connectivity of every two consecutive nodes in the sequence of nodes, and if there are two consecutive nodes in the sequence of nodes which are not connected in the map, identify a path which includes two or more nodes interconnecting the two consecutive nodes in the map, and stitch the two consecutive nodes by inserting the two or more nodes between the two consecutive nodes.

At step 404, the routing metrics computation module 312 is further configured to obtain a suggested route generated based on the inferred location of origin and the inferred location of destination. In some embodiments, the suggested route is obtained from the route engine module 334.

At step 406, the routing metrics computation module 312 is configured to quantify a deviation of the suggested route from the ground truth route by calculating an offcourse ratio based on a combined length of road segments in the suggested route that are matched to corresponding road segments in the ground truth route and a combined length of road segments in the ground truth route.

As described above, the offcourse ratio calculated by route deviation quantification as described above is used as an evaluation metric for vehicular route learning. Given a map, the topology of the road network and the road class of each road segment is fixed. Therefore, the vehicular route learning in the present application is formulated as identifying an optimal speed of each road segment in a road network. As described above, vehicular route learning is an independent process which can be triggered on demand or in a batch depending on various requirements, which may or may not be triggered by an offcourse ratio greater than a threshold value.

A road network may comprise millions of road segments. Directly inferring speeds for millions of road segments via exhaustive enumeration is intractable and costs considerable computation bandwidth of a computing system. To address this data volume issue, the present applications assigns a same speed to road segments with a same road class. In this manner, as the number of road classes in a map is limited (e.g. usually less than 15), the vehicular route learning of the present application that finds an optimal speed of each road class can significantly reduce computational pressure and improve learning performance. The optimised speed identified by the vehicular route learning of the present application is not a real speed but a routing weight for generating an optimal route.

Figure 7:
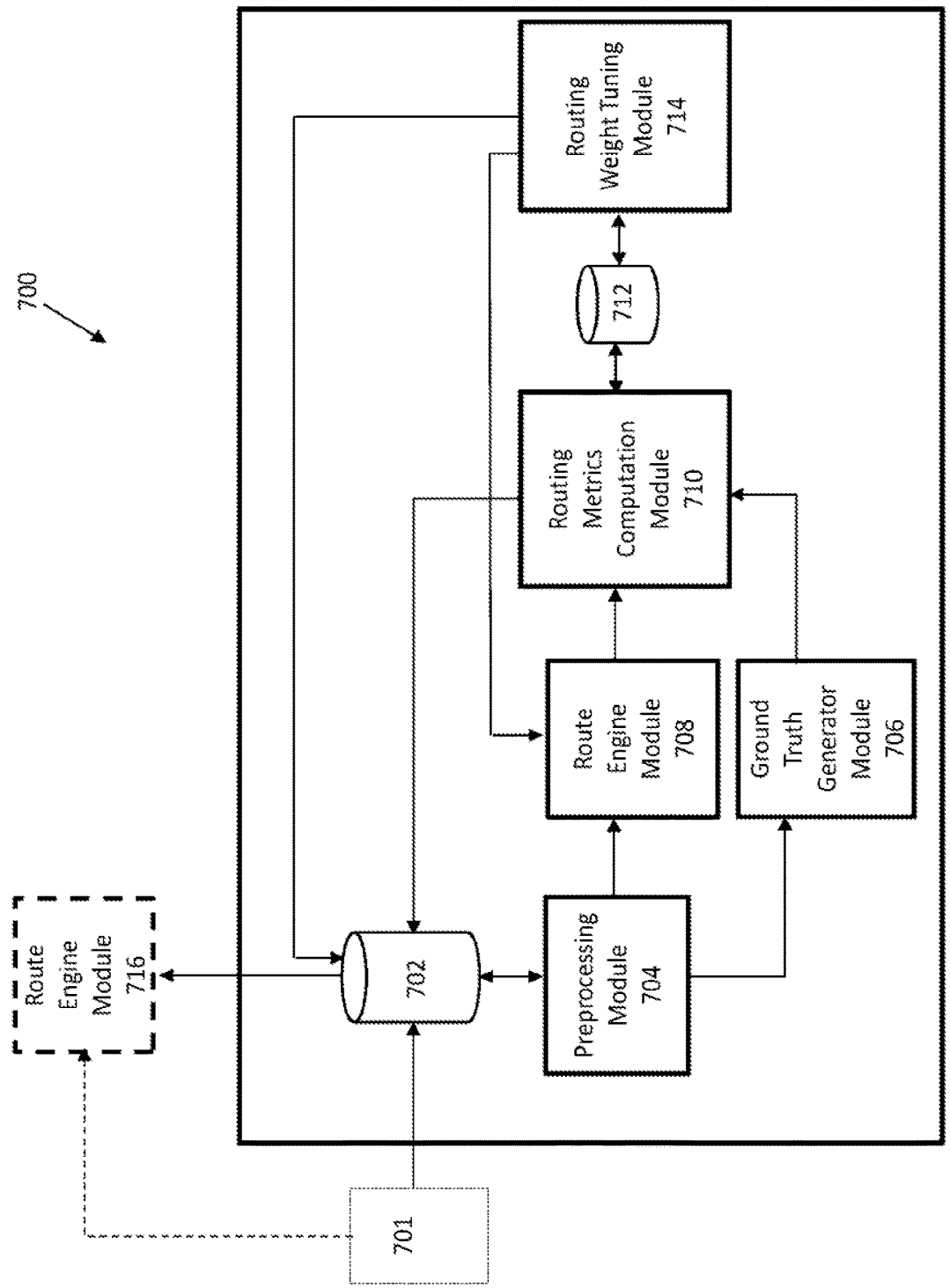
FIG. 7 shows a schematic diagram of a system for vehicular route learning, according to an embodiment.

FIG. 7 shows an embodiment of a system 700 for vehicular route learning. The architecture of the system 700 utilises the structure of the device 200 for route deviation quantification as shown in FIG. 2.

The system 700 includes a pre-processing module 704, a ground truth generator module 706, a routing metrics computation module 710 and a routing weight tuning module 714.

Figure 8:
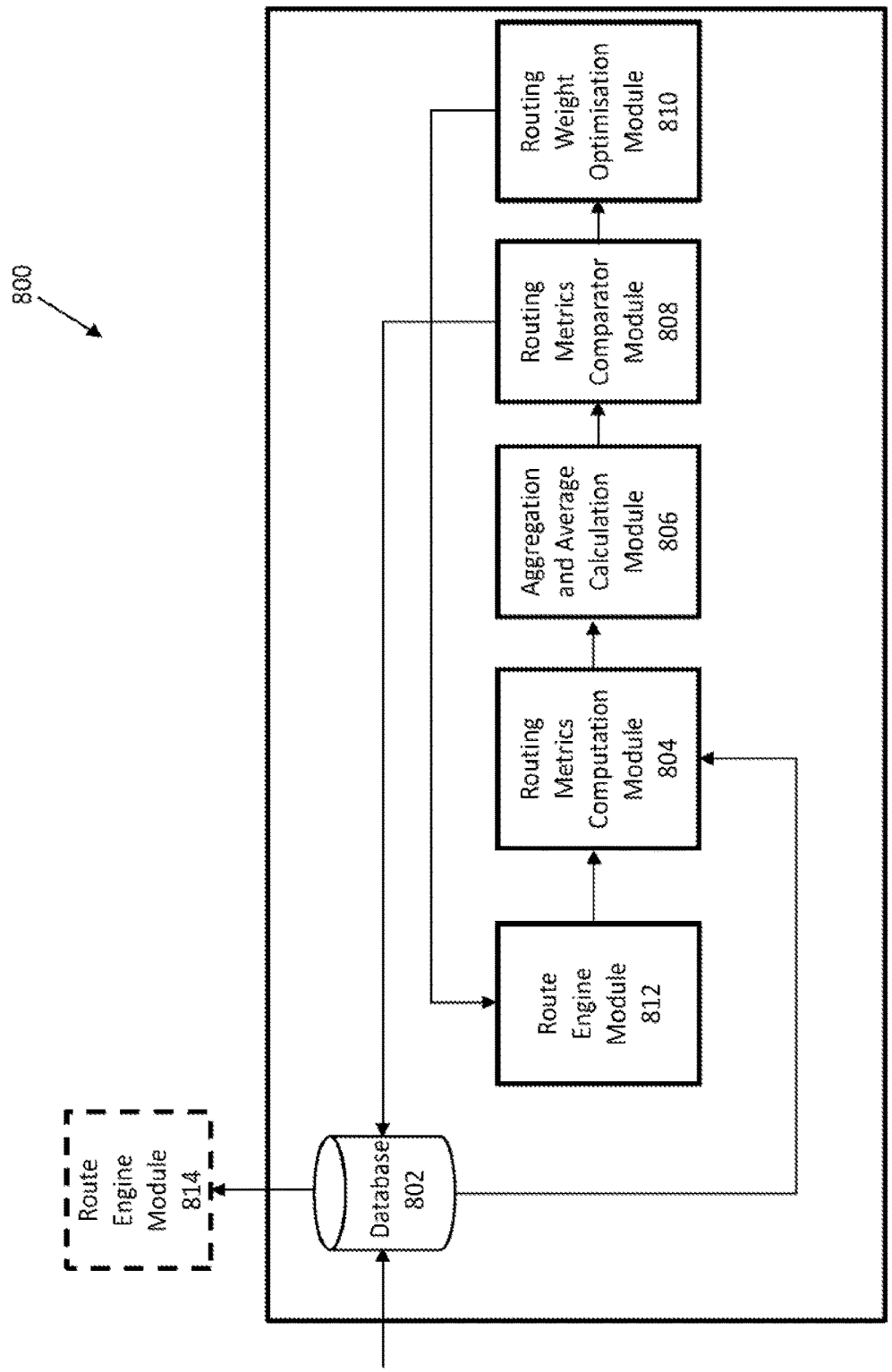
FIG. 8 shows a schematic diagram f a system for vehicular route learning, according to another embodiment.

FIG. 8 shows another embodiment of a system 800 for vehicular route learning. The system 800 includes a routing metrics computation module 804, an aggregation and average calculation module 806, a routing metrics comparator module 808, a routing weight optimisation module 810 and a route engine module 812.

In some embodiments, the system 800 for vehicular route learning can be implemented as the routing weight tuning module 714 in the system 700.

Figure 9:
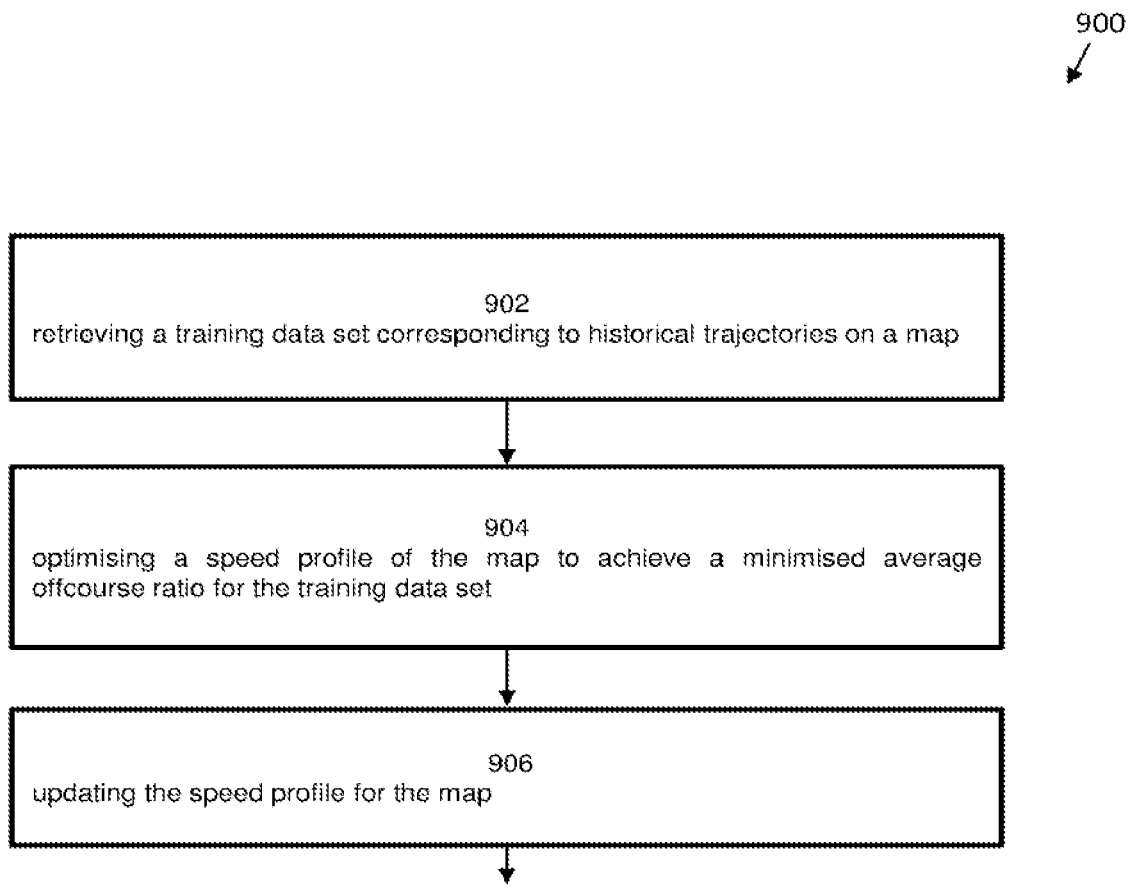
FIG. 9 is a flow chart illustrating a method for vehicular route learning, according to an embodiment. Vehicular route learning can be an independent process which can be triggered on demand or in a batch, depending on various requirements.

FIG. 9 shows an embodiment method 900 for vehicular route learning. The method 900 comprises the following steps that can be performed by the system 700 and 800 as well as the computing device 200 implemented as a system for vehicular route learning:

Step 902: retrieving a training data set corresponding to historical trajectories on a map;
Step 904: optimising a speed profile of the map to achieve a minimised average offcourse ratio for the training data set; and
Step 906: updating the speed profile for the map.

At step 902, the routing weight tuning module 714 is configured to retrieve a training data set corresponding to historical trajectories on a map. In some embodiment, the training data can be constructed prior to step 902 and comprises a collection of data points. Each data point corresponds to a historical trajectory on the map and contains an inferred location of origin of the historical trajectory, an inferred location of destination of the historical trajectory, a suggested route connecting the inferred location of origin and the inferred location of destination generated based on the map and the speed profile, and a corresponding ground truth route of the historical trajectory.

In some embodiments, a training data set can be presented as D, which comprises a set of data points where each data point $d=<l_o,l_d,P,\hat{P}>$ contains a location of origin $l_o$ and a destination $l_d$, along with a suggested route P connecting the two locations and a ground truth route $\hat{P}$. The suggested route P and the ground truth route $\hat{P}$ can be obtained in accordance with the method 400 for route deviation quantification as described above with respect to FIG. 4.

In some embodiments, the training data can be constructed by a database module 712 in the system 700 connected to the routing metrics computation module 710 that receives offcourse ratios along with inferred locations of origin, inferred locations of destination, ground truth routes, and suggested routes connecting the inferred locations of origin and the inferred locations of destination that are generated by the routing metrics computation module 710, the preprocessing module 704, the ground truth module 706 in a pre-determined period of time.

In some embodiments, the training data can be constructed by a database module 802 in the system 800 connected to a device (not shown in FIG. 8) for route deviation quantification or the memory module 104 of the device 100 when implemented as a system for vehicular route learning, in a similar manner as the a database module 702.

As described above, the pre-determined period of time can be, e.g. 8 AM to 10 AM every day in a predetermined month, or 5 PM to 8 PM every Friday in a predetermined year. It is up to the practical needs to design such a pre-determined period of time for receiving sufficient data for the vehicular route learning.

Prior to step 902, a database module 702 in the system 700 or the memory module 104 can be configured to partition historical data into a plurality of training data sets that include the extracted training data set. The historical data comprises raw GPS data of historical trajectories stored in the database module 702 or the memory module 104. Each training data set in the plurality of training data sets comprises data points corresponding to historical trajectories captured in a pre-determined hour of a day on the map. As mentioned above, the pre-determined hour can be 8 AM to 9 AM, 5 PM to 6 PM, or any hour depending on the practical needs.

Due to hyper-localization of traffic conditions in different countries or cities, vehicular route learning by hour has advantages over learning by peak or non-peak hour as it is difficult to specify an exact period of peak hours for each city due to time zone and traffic regulations and traffic patterns in each country. By partitioning the training data by hour, data size of each hour bucket is reduced significantly for big cities and it advantageously becomes convenient to scale the vehicular route learning, as learning by hour can take place in parallel. In this approach, the training data set for non-peak hours is upsampled to make sure the data size is balanced over each hour.

Thereafter, the preprocessing module 704 or the processor module 102 preprocesses the raw GPS data of the historical trajectories to obtain filtered trajectories with the locations of origin and the locations of destination. Each of the filtered trajectories comprises a time-ordered sequence of GPS pings. Each of the GPS pings indicates a location of a vehicle at a timestamp during the filtered trajectory.

In some embodiments, step 902 includes a sub-step at which the preprocessing module 704 or the processor module 102 constructs a speed profile, wherein the speed profile comprises a collection of speeds, each speed corresponding to a road class in the map.

In some embodiments, the preprocessing module 704 or the processor module 102 aggregates the raw GPS data of the historical trajectories to determine a historical speed for each road class in the map so as to construct the speed profile. Thereafter, the route engine module 708 or the processor module 102 builds a road network based on the speed profile and the map.

Thereafter, for each of the filtered trajectories, the ground truth generator module 706 or the processor module 102 converts the time-ordered sequence of GPS pings to the ground truth route in the training data set.

At step 904, the routing weight tuning module 714, the routing metrics computation module 804 or the processor module 120 optimises the speed profile of the map to achieve a minimised average offcourse ratio for the training data set. In some embodiments, step 904 includes the following sub-steps 904A, 904B and 904C.

At step 904A, the routing weight tuning module 714, the routing metrics computation module 804 or the processor module 120 calculates an offcourse ratio for each suggested route in the training data set to quantify a deviation between the suggested route and the corresponding ground truth route based on a combined length of road segments in the suggested route that are matched to corresponding road segments in the corresponding ground truth route and a combined length of road segments in the corresponding ground truth route.

At step 904A, the calculation of the offcourse ratio for each suggested route in the training data set is according to the steps as described in the method 400 for route deviation quantification.

At step 904B, the routing weight tuning module 714, the aggregation and average calculation module 806 aggregates calculated offcourse ratios and determines an average offcourse ratio for all the suggested routes in the training data set.

At step 904D, for each road class in the map, the routing weight tuning module 714, the routing metrics comparator module 808 working together with the routing weight optimisation module 810, or the processor module 102 optimises the corresponding speed to identity an optimised speed that enables the route engine generator module to regenerate suggested routes for inferred locations of origin and inferred locations of destination in the training data set with a minimised average offcourse ratio.

As described above, the vehicular route learning process minimises the average offcourse ratio over the training data set D so as to not overfit on a single route. As the size of the training data set D is sufficiently large in practice, the size of the training data set D is usually in millions), the sample routes captured in the training data set D will cover all the road segments on a map and the road segment weight learned will reflect an optimal route between any two nodes on the map.

In this manner, the vehicular route learning is modelled to find an optimal road network $\hat{G}$ that has a minimised average offcourse ratio, i.e.

$$\hat{G} = \text{argmin } G\Sigma_{(\hat{P},P|G)\subset D}\text{OffcourseRatio}(\hat{P},P|G), \quad (3)$$

Figure 10:
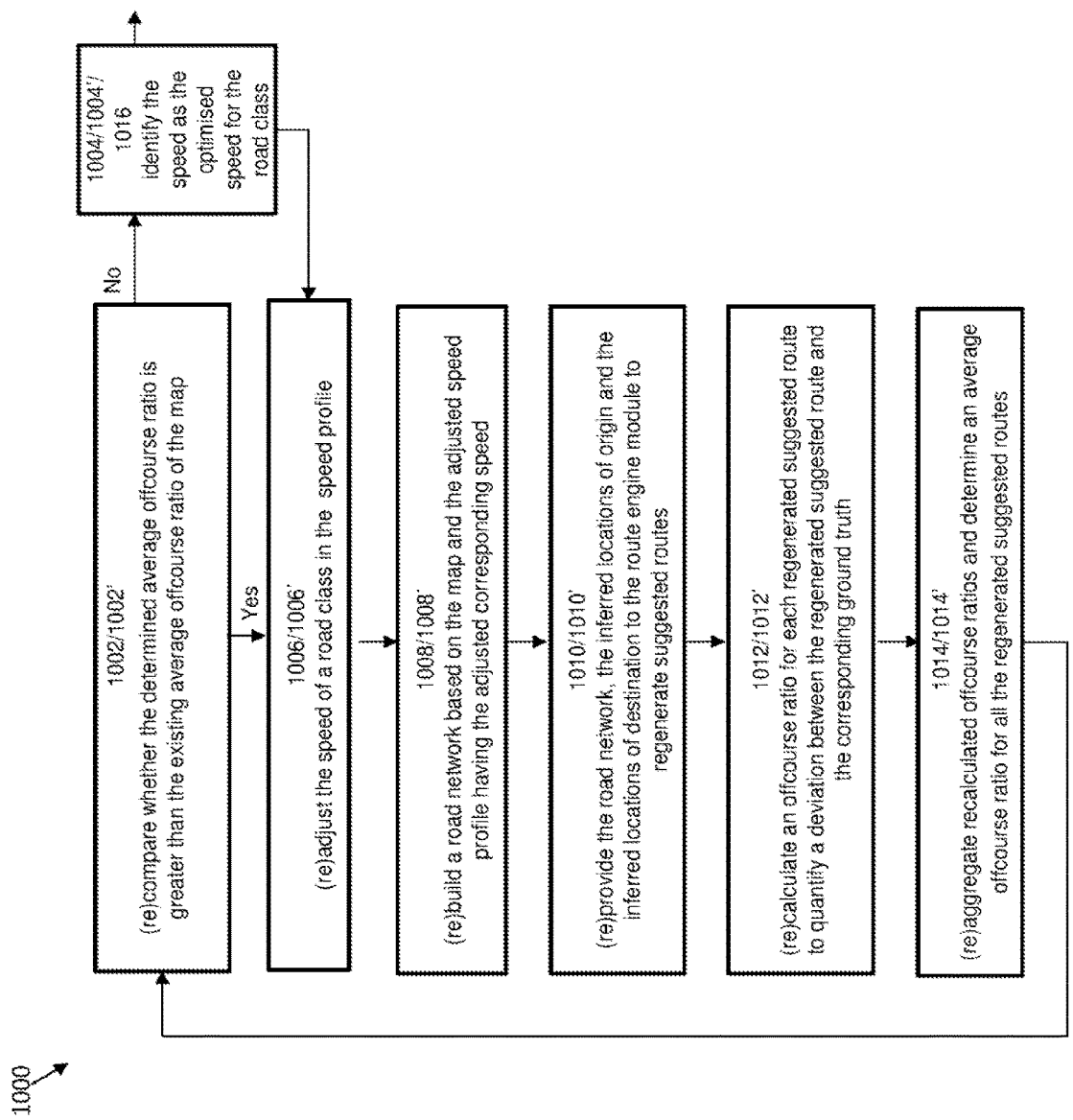
FIG. 10 is a flow chart illustrating a method for optimising speed for each road class in the map, according to an embodiment. This method includes sub-steps that can be used in step 904 of the exemplified method 900 for vehicular route learning, as shown in FIG. 9.

An embodiment of the vehicular route learning model as defined in equation (3) is depicted in FIG. 10 and described in the corresponding paragraphs.

At step 906, the routing weight tuning module 714, the routing metrics comparator module 808, or the processor module 102 updates the speed profile with optimised speeds of the corresponding road classes as obtained in step 904.

In some embodiments, in response to a routing request received at an acquisition module 701 of the system 700 with a location of origin corresponding to one of the inferred locations of origin and a location of destination corresponding to one of the inferred locations of destination, the system 700 may generate and output a suggested route based on the map and the updated speed profile in response to the routing request.

In some embodiments, when a routing request is received, based on attributes specified in the request (timestamp, wheels of vehicles, cities, etc.), the route engine module in the system 700 can choose the corresponding updated speed profile to generate a suggested route and output the suggested route to a user's device (not shown).

Validation of the vehicular route learning as shown in FIG. 9 can be carried out over a data set constructed from historical data captured in a different period of time compared to the training data set. For example, as the vehicular route learning is completed and an updated speed profile is obtained for a particular map, a validation process can be performed as follows.

First, the routing weight tuning module 714, the routing metrics computation module 804 or the processor module 120 retrieves a validation data set (obtained in a similar manner and in the same format as the training data set, based on historical data captured in a different period of time in the same city) that is constructed for the same map.

Thereafter, the routing weight tuning module 714, the routing metrics computation module 804 or the processor module 120 calculates an offcourse ratio for each suggested route in the validation data set according to the steps as described in the method 400 for route deviation quantification, aggregates the calculated offcourse ratios and determines an average offcourse ratio for all the suggested routes in the validation data set in a manner as described with respect to step 904B. The steps of calculation, aggregation and determination of the average offcourse ratio for all the suggested routes in the validation data set are conducted with an original speed profile of the map and the updated speed profile of the map.

Subsequently, the routing weight tuning module 714, the routing metrics computation module 804 or the processor module 120 compares the average offcourse ratio for all the suggested routes in the validation data set obtained using the original speed profile of the map and the average offcourse ratio for all the suggested routes in the validation data set obtained using the updated speed profile of the map.

If the average offcourse ratio for all the suggested routes in the validation data set obtained using the updated speed profile of the map is smaller than the validation data set obtained using the original speed profile of the map, the process of vehicular route learning as shown in FIG. 9 is validated to be successful.

On the other hand, if the average offcourse ratio for all the suggested routes in the validation data set obtained using the updated speed profile of the map is not smaller than the validation data set obtained using the original speed profile of the map, a new training data set can be constructed and retrieved by the routing weight tuning module 714, the routing metrics computation module 804 or the processor module 120 for repeating steps 902 to 906 of the process 900 of vehicular route learning.

FIG. 10 illustrates an embodiment of a method 1000 for optimising speed for each road class in the map. This method includes sub-steps 1002 to 1016 that can be used in step 904 of the method 900.

As shown in FIG. 10, the step 904 can include a sub-step 1002 in which the routing weight tuning module 714, the routing metrics comparator module 808, or the processor module 102 compares whether the determined average offcourse ratio for all the suggested routes in the training data set is greater than an existing average offcourse ratio of the map.

If the comparison at sub-step 1002 indicates that the determined average offcourse ratio for all the suggested routes in the training data set is not greater than the existing average offcourse ratio of the map, the routing weight tuning module 714, the routing metrics comparator module 808, or the processor module 102 identifies the corresponding speed as the optimised speed for the road class at sub-step 1004. At substep 1004, the speed profile can be accordingly updated with the optimised speed. The determined average offcourse ratio and the updated speed profile can be stored at the database module 702, 802 or the memory module 104. The existing averaged off-course value can be overwritten with the determined average offcourse ratio in the database module 702, 802 or the memory module 104.

Subsequent to sub-step 1004, the routing weight tuning module 714, the routing weight optimisation module 810, or the processor module 102 can continue to adjust the corresponding speed of the road class at sub-step 1006 to search for potential better result.

On the other hand, if the comparison at sub-step 1002 indicates that the determined average offcourse ratio for all the suggested routes in the training data set is greater than the existing average offcourse ratio of the map, the routing weight tuning module 714, the routing weight optimisation module 810, or the processor module 102 adjusts the corresponding speed of a road class in the speed profile at sub-step 1006.

Subsequent to sub-step 1006, at sub-step 1008, the routing weight tuning module 714, the route engine module 812, or the processor module 102 builds a road network based on the map and the adjusted speed profile having the adjusted corresponding speed.

Subsequent to sub-step 1008, at sub-step 1010, the routing weight tuning module 714, the route engine module 812, or the processor module 102 provides the road network, the inferred locations of origin and the inferred locations of destination to the route engine module to regenerate suggested routes.

Subsequent to sub-step 1010, at sub-step 1012, the routing weight tuning module 714, the routing metrics computation module 804, or the processor module 102 recalculates an offcourse ratio for each regenerated suggested route to quantify a deviation between the regenerated suggested route and the corresponding ground truth route.

Subsequent to sub-step 1012, at sub-step 1014, the routing weight tuning module 714, the aggregation and average calculation module 806, or the processor module 102 aggregates recalculated offcourse ratios and determine an average offcourse ratio for all the regenerated suggested routes.

Subsequent to sub-step 1014, at sub-step 1002', the routing weight tuning module 714, the routing metrics comparator module 808, or the processor module 102 compares whether the determined average offcourse ratio for all the regenerated suggested routes is greater than the existing average offcourse ratio of the map.

Subsequent to sub-step 1002', if the comparison at sub-step 1002' indicates that the determined average offcourse ratio for all the regenerated suggested routes is greater than the existing average offcourse ratio of the map, the routing weight tuning module 714, the module 804, 806, 808, 810 or 812 in the system 800, or the processor module 102 iterates adjusting the corresponding speed of the road class, as depicted in substeps 1006', 1008', 1010', 1012' and 1014'.

Subsequent to sub-step 1002', if the comparison at sub-step 1002' indicates that the determined average offcourse ratio for all the regenerated suggested routes is not greater than the existing average offcourse ratio of the map, the routing weight tuning module 714, the routing metrics comparator module 808, or the processor module 102 identifies the adjusted corresponding speed as the optimised speed for the road class at step 1004'. At sub-step 1004', the speed profile can be accordingly updated with the optimised speed. The determined average offcourse ratio and the updated speed profile can be stored at the database module 702, 802 or the memory module 104. The existing averaged off-course value can be overwritten with the determined average offcourse ratio in the database module 702, 802 or the memory module 104.

Subsequent to sub-step 1004', the routing weight tuning module 714, the routing weight optimisation module 810, or the processor module 102 can continue to adjust the corresponding speed of the road class at sub-step 1006' to search for potential better result, and iterate the steps as depicted in sub-steps 1008', 1010', 1012' and 1014'.

If after the iteration of sub-steps of 1006', 1008', 1010', 1012' and 1014', the comparison at sub-step 1002' indicates that the average offcourse ratio determined at step 1014' for all the regenerated suggested routes based on the speed adjusted in step 1006' is not greater than the existing average offcourse ratio of the map, the routing weight tuning module 714, the routing metrics comparator module 808, or the processor module 102 can at sub-step 1016 identify the average offcourse ratio determined at step 1014' as a minimised average offcourse ratio for the training data set and identify the speed adjusted in step 1006' as the optimised speed for the road class. At sub-step 1016, the speed profile can be accordingly updated with the optimised speed. The minimised average offcourse ratio and the updated speed profile can be stored at the database module 702, 802 or the memory module 104.

FIG. 11 shows an exemplary method 1100 that also can be used as sub-steps in step 904 for optimising speed for each road class in the map. The exemplary method 1100 is presented in the form of an algorithm.

As shown in FIG. 11, the method 1100 includes a two-step tuning framework that receives a training data set D, a map, and a speed profile as inputs and produces an optimised speed profile as an output.

As shown in line 1 of FIG. 11, the method 1100 starts iterating optimising each road class and its corresponding speed to obtain an optimal speed s for each road class sequentially. At the beginning of a first iteration, a smallest speed s_MIN of a road class is set as an initial speed of the road class, as shown in line 2 of FIG. 11. As shown in line 3 of FIG. 11, an initial average offcourse ratio is calculated for the training data set D based on the map and a speed profile with the initial speed of the road class.

For each road class, an optimal speed is obtained via a grid search with two sweeps. As shown in lines 4 to 7 of FIG. 11, at the first step the system 700, 800 or the processor module 102 finds a region where the optimal speed is achieved using iteration of speed adjusting by a large step of length. As shown in lines 9 to 12 of FIG. 11, at the second step, the system 700, 800 or the processor module 102 uses a small step of length for iteration of speed adjusting to find the final optimal speed with a smallest offcourse ratio.

For example, in the second step, the surrounding possible values s* are gone through to further tune the optimal speed s obtained in the first step. In an alternative embodiment of the step step, line 8 of FIG. 11 can be changed to "s*←max (s−Δ, s_MIN)" and line 9 of FIG. 11 can be changed to "while s*<min (s_MAX, s+Δ) do". This change can avoid potential situations when a tuned surrounding possible value s* goes beyond predefined min and max values. If after the first step, the optimal speed s is equal to s_MIN, in the second step, the method 1100 will only examine the range between s_MIN to s_MIN+Δ.

For example, s_MIN can be set as 8 km/h, and s_MAX can be set as 100 km/h. In an embodiment, in the first step, the large step of length (step 1) can be set as step 1=10 km/h. In this manner, an optimal speed can be obtained at the first step at s=58 km/h. Subsequently in the second step, we set a range Δ for tuning surrounding possible values s* of the optimal speed s as Δ=10 km/h and the small step of length as step_2=1 km/h. In this manner, the surrounding possible values s* of the optimal speed are examined from s−Δ (i.e. 58−10=48 km/h) to s+Δ (i.e. 58+10=68 km/h). In this manner, a final optimal speed s*=63 km/h is identified with a minimum average offcourse ratio.

When a CalcRatioAndCompare function as mentioned in lines 3, 6 and 11 of FIG. 11 is performed, the system 700, 800 or the processor module 102 rebuilds a road network based on the map and a new speed profile, regenerates suggested routes on the rebuilt road network based on the locations of origin and destination, and calculates an average offcourse ratio for the regenerated suggested routes compared to the ground truth routes. The system 700, 800 or the processor module 102 then compares the calculated average offcourse ratio with an existing offcourse ratio (e.g. the initial average offcourse ratio as calculated in line 3 of FIG. 11), picks whichever is smaller, and overwrites the existing average offcourse ratio with the corresponding speed, as shown in line 13 of FIG. 11.

In implementing the two-step tuning framework of FIG. 11, it is observed that the order of road class optimisation has little impact on the final speed profile optimising result. Therefore, it can be seen that the speed of each road class is independent, which can in turn significantly reduce a solution space.

Figure 12:
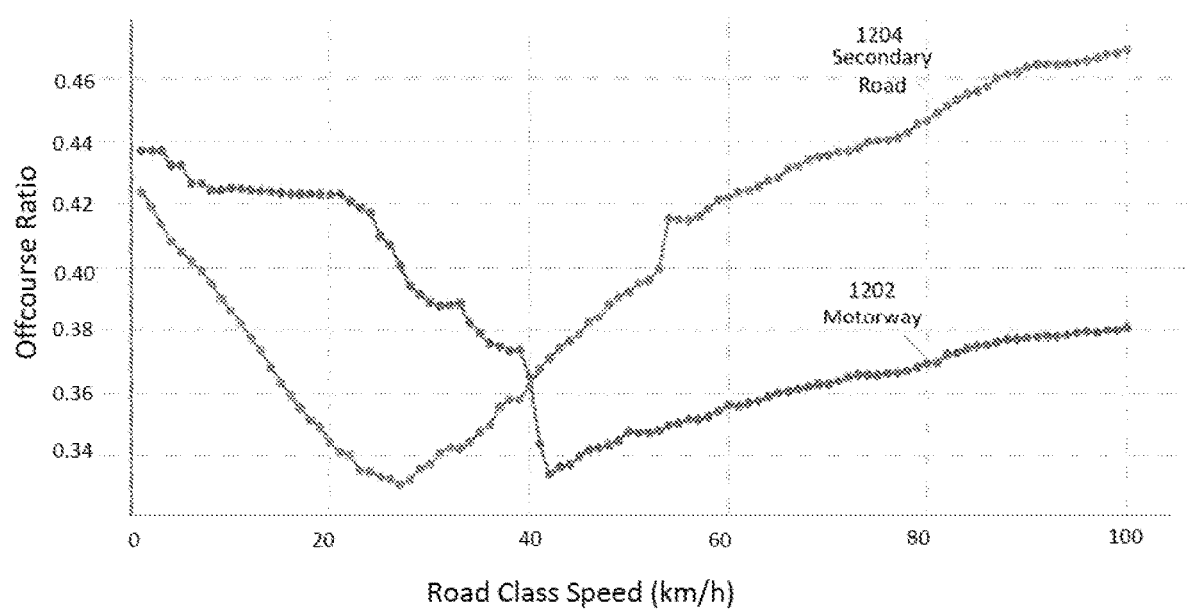
FIG. 12 shows a diagram depicting a relationship between offcourse ratio and road class speed without optimisation, according to an embodiment. This relationship can be obtained during implementation of the exemplary method for optimising speed for each road class in a map as exemplified in FIG. 11. The relationship can be obtained based on historical trajectories captured during a pre-determined period of time (e.g. every 8 AM to 9 AM of a week) in a pre-determined city (e.g. Bangkok), which can be in turn used to identify an optimised speed for each road class at the pre-determined period of time (e.g. 8 AM to 9 AM) in the pre-determined city (e.g. Bangkok) according to the methods and systems for vehicular route learning as exemplified in FIGS. 7 to 11.

FIG. 12 shows an example diagram 1200 depicting a relationship between offcourse ratio and road class speed without optimisation. This relationship can be obtained during implementation of the method 1100 for optimising speed for each road class in a map as exemplified in FIG. 11.

As shown in FIG. 12, the relationship between road class speed and offcourse ratio is near unimodal. In FIG. 12, the speed of two particular road classes (e.g. motorway and secondary road in Bangkok) are plotted with step length equals to 1. The corresponding offcourse ratio is then calculated according to steps as shown in FIG. 3. In this manner, a relationship curve 1202 for motorway road and a relationship curve 1204 for secondary road are obtained. It can be observed from relationship curves 1202, 1204 that there is one optimal speed for each road class, however there are multiple local optima, as the respective relationship curve 1202, 1204 is not smooth. The not smooth curve can be addressed in two sweeps by the two-step tuning framework in FIG. 11. In the first sweep (interchangably referred as the first step), as the step length is large, a region with an optimal value is likely to be located. In the second sweep (interchangably referred as the second step), the global optimum will be found with small steps within a tuning range $\Delta \geq \text{step}_1$. There are situations where global optimum cannot be found in the first sweep and consequently returns a sub-optimal speed, but it is acceptable as the main focus for vehicular route learning is to improve the average offcourse ratio. Additionally, the two-step tuning framework in FIG. 11 runs much faster compared to an exhaustive search of all solution space with small steps.

Figure 13:
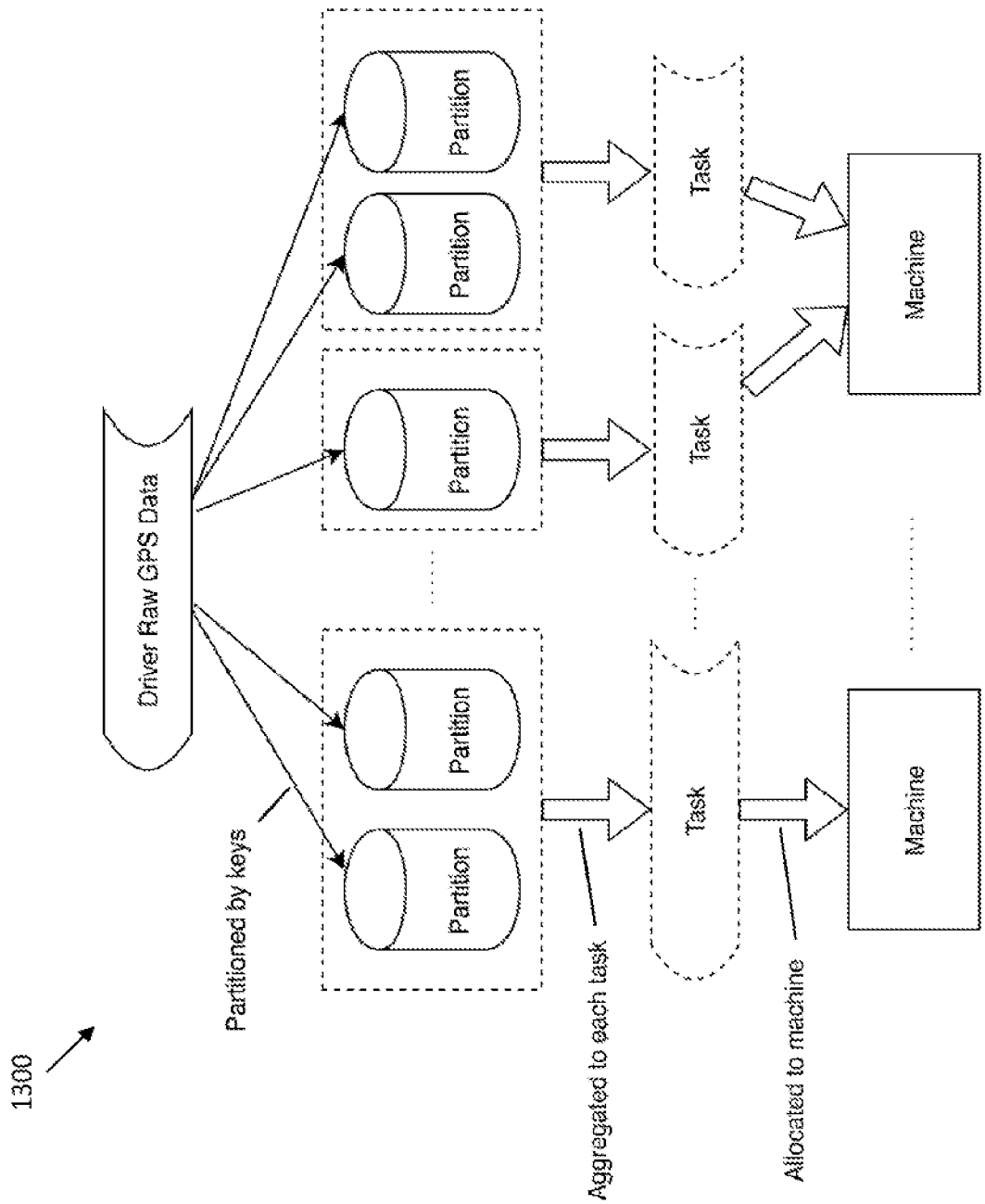
FIG. 13 is a block diagram of a parallel computing system suitable for use in implementation of the methods and devices for route deviation quantification as exemplified in FIGS. 1 to 6 and/or the methods and systems for vehicular route learning as exemplified in FIGS. 7 to 11.

FIG. 13 is a block diagram of a parallel computing system 1300 suitable for use in implementation of the methods and devices for route deviation quantification as exemplified in FIGS. 1 to 6 and/or the methods and systems for vehicular route learning as exemplified in FIGS. 7 to 11.

As described above, the computation of route deviation quantification can be conducted independently for each historical trajectory. Similarly, vehicular route learning is optimised based on each training data set, therefore different training data sets can be processed in parallel.

As shown in FIG. 13, raw GPS data is firstly partitioned by a predefined partition key for indexing. Partition keys include year, month, day, hour, city and wheels of vehicle, as traffic conditions and routing preferences are different among cities and vary between cars and motorbikes.

Thereafter, the partitioned data is aggregated into each task. The aggregation strategy depends on the type of task, for instance, routing-metrics computation, e.g. route deviation quantification usually aggregate each day's GPS data whereas vehicular route learning can require weeks of GPS data that is partitioned by hour.

Subsequently, the respective tasks can be allocated to respective machines equally by data size and run in parallel in each machine.

Figure 14:
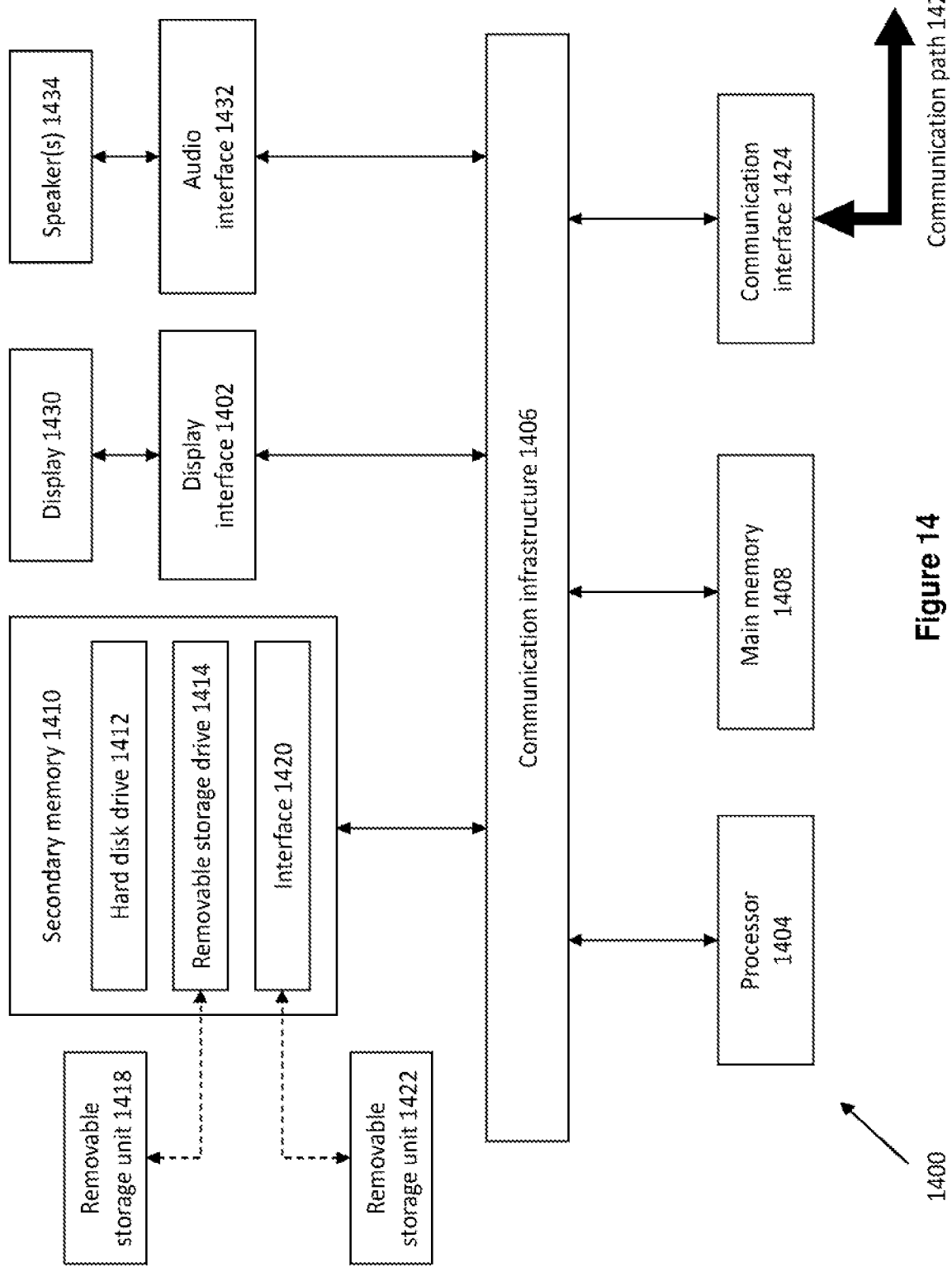
FIG. 14 is a block diagram of a computer system suitable for use as a device for route deviation quantification as shown in FIGS. 2 to 3 and/or a system for vehicular route learning as shown in FIGS. 7 to 8.

FIG. 14 is a block diagram of a computer system 1400 suitable for use as a device for route deviation quantification as shown in FIGS. 2 to 3 and/or a system for vehicular route learning as shown in FIGS. 7 to 8.

The following description of the computer system/computing device 1400 is provided by way of example only and is not intended to be limiting.

As shown in FIG. 1400, the example computing device 1400 includes a processor 1404 for executing software routines. Although a single processor is shown for the sake of clarity, the computing device 1400 may also include a multi-processor system. The processor 1404 is connected to a communication infrastructure 1406 for communication with other components of the computing device 1400. The communication infrastructure 1406 may include, for example, a communications bus, cross-bar, or network.

The computing device 1400 further includes a main memory 1408, such as a random access memory (RAM), and a secondary memory 1410. The secondary memory 1410 may include, for example, a hard disk drive 1412 and/or a removable storage drive 1414, which may include a magnetic tape drive, an optical disk drive, or the like. The removable storage drive 1414 reads from and/or writes to a removable storage unit 1418 in a well-known manner. The removable storage unit 1418 may include a magnetic tape, optical disk, or the like, which is read by and written to by removable storage drive 1414. As will be appreciated by persons skilled in the relevant art(s), the removable storage unit 1418 includes a computer readable storage medium having stored therein computer executable program code instructions and/or data.

In an alternative implementation, the secondary memory 1410 may additionally or alternatively include other similar means for allowing computer programs or other instructions to be loaded into the computing device 1400. Such means can include, for example, a removable storage unit 1422 and an interface 1420. Examples of a removable storage unit 1422 and interface 1420 include a removable memory chip (such as an EPROM or PROM) and associated socket, and other removable storage units 1422 and interfaces 1420 which allow software and data to be transferred from the removable storage unit 1422 to the computer system 1400.

The computing device 1400 also includes at least one communication interface 1424. The communication interface 1424 allows software and data to be transferred between computing device 1400 and external devices via a communication path 1426. In various embodiments, the communication interface 1424 permits data to be transferred between the computing device 1400 and a data communication network, such as a public data or private data communication network. The communication interface 1424 may be used to exchange data between different computing devices 1400 which such computing devices 1400 form part an interconnected computer network. Examples of a communication interface 1424 can include a modem, a network interface (such as an Ethernet card), a communication port, an antenna with associated circuitry and the like. The communication interface 1424 may be wired or may be wireless. Software and data transferred via the communication interface 1424 are in the form of signals which can be electronic, electromagnetic, optical or other signals capable of being received by communication interface 1424. These signals are provided to the communication interface via the communication path 1426.

Optionally, the computing device 1400 further includes a display interface 1402 which performs operations for rendering images to an associated display 530 and an audio interface 532 for performing operations for playing audio content via associated speaker(s) 534.

As used herein, the term "computer program product" may refer, in part, to removable storage unit 1418, removable storage unit 1422, a hard disk installed in hard disk drive 1412, or a carrier wave carrying software over communication path 1426 (wireless link or cable) to communication interface 1424. Computer readable storage media refers to any non-transitory tangible storage medium that provides recorded instructions and/or data to the computing device 1400 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card such as a PCMCIA card and the like, whether or not such devices are internal or external of the computing device 1400. Examples of transitory or non-tangible computer readable transmission media that may also participate in the provision of software, application programs, instructions and/or data to the computing device 1400 include radio or infra-red transmission channels as well as a network connection to another computer or networked device, and the Internet or Intranets including e-mail transmissions and information recorded on Websites and the like.

The computer programs (also called computer program code) are stored in main memory 1408 and/or secondary memory 1410. Computer programs can also be received via the communication interface 1424. Such computer programs, when executed, enable the computing device 1400 to perform one or more features of embodiments discussed herein. In various embodiments, the computer programs, when executed, enable the processor 1404 to perform features of the above-described embodiments. Accordingly, such computer programs represent controllers of the computer system 1400.

Software may be stored in a computer program product and loaded into the computing device 1400 using the removable storage drive 1414, the hard disk drive 1412, or the interface 1420. Alternatively, the computer program product may be downloaded to the computer system 1400 over the communications path 1426. The software, when executed by the processor 1404, causes the computing device 1400 to perform functions of embodiments described herein.

It is to be understood that the embodiment of FIG. 5 is presented merely by way of example. Therefore, in some embodiments one or more features of the computing device 1400 may be omitted. Also, in some embodiments, one or more features of the computing device 1400 may be combined together. Additionally, in some embodiments, one or more features of the computing device 1400 may be split into one or more component parts.

Figure 15:
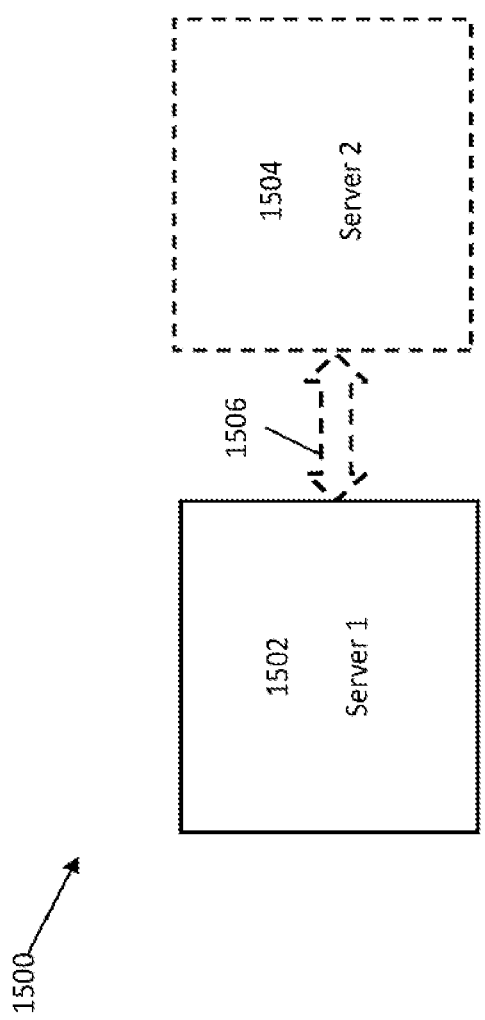
FIG. 15 is a schematic diagram of a computer system suitable for implementing the steps as required in a method for route deviation quantification as described herein (e.g. as exemplified in FIG. 4) and/or a method for vehicular route learning as described herein (e.g. as exemplified in FIGS. 9 to 10).

FIG. 15 shows a computer system 1500 suitable for implementing the steps as required in the methods for route deviation quantification and/or the methods for vehicular route learning, as described above.

As shown, the computer system 1500 may include one or more computing devices 1502, 1504 that are communicable to each other. Each of the computing devices 1502, 1504 can be configured to perform one or more steps as described in the above methods.

Each of the one or more computing devices 1502, 1504 can be implemented as a server to perform one or more steps as described above. These servers may belong to a same entity or different entities.

For example, when implementing a method 400 for route deviation quantification, the steps 402, 404 and 406 may be conducted by the computing device 1502 at a same entity. In some alternative examples, the steps 402 and 404 may be conducted by the computing device 1504 at a first entity, and the ground truth route and the suggested route obtained from steps 402 and 404 may then be forwarded via a communication link 1506 to the computing device 1504 for conducting step 406 at a second entity.

The techniques described in this specification produce one or more technical effects. In particular, the present disclosure advantageously utilises route deviation quantification as a key routing metric to accurately evaluate deviation of a suggested route generated by a route engine module and a ground truth route actually taken by a driver and subsequently constructs a vehicular route learning system with customised training data sets (e.g. extract a training data set having historical data captured in a same hour of each day in a month in a particular city) utilising an offcourse ratio calculated by the route deviation quantification. In addition, the present disclosure advantageously utilises parallel computing to partition and process data for the route deviation quantification and the vehicular route learning, which allows learning from a great volume of historical data without compromising performance.

It will be appreciated by a person skilled in the art that numerous variations and/or modifications may be made to the present disclosure as shown in the specific embodiments without departing from the scope of the specification as broadly described. The present embodiments are, therefore, to be considered in all respects to be illustrative and not restrictive.

What is claimed is:

1. A device for route deviation quantification of a suggested route, the device comprising:
   a processor module; and
   a memory module including computer program code;
   the memory module and the computer program code configured to, with the processor module, cause the device to:
   obtain a ground truth route based on a filtered trajectory obtained from a historical trajectory on a map, the filtered trajectory including an inferred location of origin and an inferred location of destination, wherein the inferred location of origin and the inferred location of destination are at least a threshold distance away from a location of origin and a location of destination, respectively;
   obtain a suggested route generated based on the inferred location of origin and the inferred location of destination;
   quantify a deviation of the suggested route from the ground truth route by calculating an offcourse ratio of a combined length of road segments in the suggested route that are matched to corresponding road segments in the ground truth route to a combined length of road segments in the ground truth route; and
   extract historical data comprising raw GPS data of the historical trajectory on the map;
   preprocess the raw GPS data of the historical trajectory to obtain the filtered trajectory with the inferred location of origin and the inferred location of destination, wherein the filtered trajectory comprises a time-ordered sequence of GPS pings, and wherein each of the GPS pings indicates a location of a vehicle at a timestamp during the filtered trajectory; and
   convert the time-ordered sequence of GPS pings to the ground truth route.

2. The device according to claim 1, wherein when preprocessing the raw GPS data of the historical trajectory to obtain the filtered trajectory with the inferred location of origin and the inferred location of destination, the device is configured to:
   filter GPS pings of the historical trajectory within the threshold distance from the location of origin and the location of destination, wherein the GPS pings of the filter trajectory is obtained from the remaining GPS pings of the historical trajectory which lie outside the threshold distance away from the location of origin and the location of destination.

3. The device according to claim 1, wherein when obtaining the suggested route, the device is configured to:
   build a road network based on the map and a speed profile of the map, the speed profile comprising a collection of speeds, each speed corresponding to a road class in the map; and
   generate the suggested route based on the road network, the inferred location of origin and the inferred location of destination.

4. The device according to claim 3, wherein the device is further caused to:
   if the offcourse ratio is greater than a threshold value, optimise the speed profile of the map to rebuild the road network for regenerating the suggested route.

5. The device according to claim 1, wherein the device is further caused to:
   if the offcourse ratio is not greater than a threshold value, output the suggested route in response to a routing request with the location of origin corresponding to the inferred location of origin and the location of destination corresponding to the inferred location of destination.

6. The device of claim 1, wherein the device is further caused to:
   store the offcourse ratio to a database corresponding to the suggested route with the inferred location of origin and the inferred location of destination.

7. The device according to claim 1, wherein when converting the time-ordered sequence of GPS pings to the ground truth route, the device is configured to:
   map the time-ordered sequence of GPS pings to a sequence of nodes in the map.

8. The device according to claim 7, wherein when converting the time-ordered sequence of GPS pings to the ground truth route, the device is further caused to:
   check connectivity of every two consecutive nodes in the sequence of nodes; and
   if two consecutive nodes are not connected in the map, identify a path interconnecting the two consecutive nodes in the map, the path including two or more nodes, and
   stitch the two consecutive nodes by inserting the two or more nodes between the two consecutive nodes.

9. The device according to claim 1, wherein when calculating the offcourse ratio, the device is caused to compute the following equation:

OffcourseRatio($\hat{P},P$)=1−Sim($\hat{P},P$), wherein P is the suggested route, $\hat{P}$ is the ground truth route, and Sim($\hat{P},P$) is a similarity score between the suggested route and the ground truth route, wherein $$Sim(\hat{P}, P) = \frac{SequentialOverlap(\hat{P}, P)}{\sum_{\hat{e} \in \hat{P}} len(\hat{e})},$$

wherein $\hat{e}$ denotes each road segment in the ground truth route, len($\hat{e}$) denotes each road segment's length in the ground truth route, and SequentialOverlap($\hat{P},P$) is the combined length of road segments in the suggested route that are matched to the corresponding road segments in the ground truth route.

10. The device according to claim 9, wherein the device is further caused to:
    search for the road segments in the ground truth route that are matched to the corresponding road segments in the suggested route,
    wherein when searching for the road segments, the device is configured to:
    sequentially conduct a search for a matching road segment in the ground truth route for each road segment in the suggested route,
    wherein during each iteration of search, start the search in the ground truth route from a road segment that is placed subsequent to a last matched road segment in the ground truth route.

11. A system for vehicular route learning, the system comprising:
    a processor module; and
    a memory module including computer program code;
    the memory module and the computer program code configured to, with the processor module, cause the system to:
    retrieve a training data set corresponding to historical trajectories on a map; wherein the training data set comprises a collection of data points, wherein each data point corresponds to one of the historical trajectories on the map and contains:
    an inferred location of origin and an inferred location of destination of the one of the historical trajectories, wherein the inferred location of origin and the inferred location are at least a threshold distance away from a location of origin and a location of destination, respectively,
    a suggested route connecting the inferred location of origin and the inferred location of destination generated based on the map and a speed profile, and
    a corresponding ground truth route of the one of the historical trajectories;
optimise the speed profile of the map to achieve a minimised average offcourse ratio for the training data set, wherein when optimising the speed profile to achieve the minimised average offcourse ratio for the training data set, the system is caused to:
    for each suggested route in the training data set, calculate an offcourse ratio of a combined length of road segments in the suggested route that are matched to corresponding road segments in the corresponding ground truth route to a combined length of road segments in the corresponding ground truth route to quantify a deviation between the suggested route and the corresponding ground truth route; and
    aggregate calculated offcourse ratios and determine an average offcourse ratio for all the suggested routes in the training data set; and
update the speed profile for the map.

12. The system according to claim 11, wherein the speed profile comprises a collection of speeds, each speed corresponding to a road class in the map.

13. The system according to claim 12, wherein when optimising the speed profile to achieve the minimised average offcourse ratio for the training data set, the system is caused to:
    for each road class in the map, optimise the corresponding speed to identify an optimised speed that enables the route engine generator module to regenerate suggested routes for inferred locations of origin and inferred locations of destination in the training data set with a minimised average offcourse ratio.

14. The system according to claim 13, wherein the system is further caused to:
    generating and outputting a suggested route based on the map and the updated speed profile in response to a routing request with a location of origin corresponding to one of the inferred locations of origin and a location of destination corresponding to one of the inferred locations of destination.

15. The system according to claim 13, wherein when optimising the corresponding speed for each road class in the map, the system is caused to:
    compare whether the determined average offcourse ratio for all the suggested routes in the training data set is greater than an existing average offcourse ratio of the map; and
    if the determined average offcourse ratio for all the suggested routes in the training data set is greater than the existing average offcourse ratio of the map,
        adjust the corresponding speed of a road class in the speed profile;
        build a road network based on the map and the adjusted speed profile having the adjusted corresponding speed;
        provide the road network, the inferred locations of origin and the inferred locations of destination to the route plan module to regenerate suggested routes;
        recalculate an offcourse ratio for each regenerated suggested route to quantify a deviation between the regenerated suggested route and the corresponding ground truth route;
        aggregate recalculated offcourse ratios and determine an average offcourse ratio for all the regenerated suggested routes;
        compare whether the determined average offcourse ratio for all the regenerated suggested routes is greater than the existing average offcourse ratio of the map; and
        if the determined average offcourse ratio for all the regenerated suggested routes is greater than the existing average offcourse ratio of the map, iterate adjusting the corresponding speed of the road class,
        if the determined average offcourse ratio for all the regenerated suggested routes is not greater than the existing average offcourse ratio of the map, identify the adjusted corresponding speed as the optimised speed for the road class.

16. The system according to claim 13, wherein when optimising the corresponding speed for each road class in the map, the system is caused to:
    compare whether the determined average offcourse ratio for all the suggested routes in the training data set is greater than an existing average offcourse ratio of the map; and
    if the determined average offcourse ratio for all the suggested routes in the training data set is not greater than the existing average offcourse ratio of the map, identify the corresponding speed as the optimised speed for the road class.

17. The system according to claim 13, wherein the system is further caused to:
    partition historical data into a plurality of training data sets that include the retrieved training data set, the historical data comprising raw GPS data of historical trajectories stored in a database module,
    wherein each training data set in the plurality of training data sets comprises data points corresponding to historical trajectories captured in a pre-determined hour of a day on the map.

18. The system according to claim 17, wherein the system is further caused to:
    preprocess the raw GPS data of the historical trajectories to obtain filtered trajectories with the inferred locations of origin and the inferred locations of destination,
    wherein each of the filtered trajectories comprises a time-ordered sequence of GPS pings, and wherein each of the GPS pings indicates a location of a vehicle at a timestamp during the filtered trajectory.

19. The system according to claim 18, wherein the system is further caused to:
    filter GPS pings of each of the historical trajectories within the threshold distance from its location of origin corresponding to its inferred location of origin and its location of destination corresponding to its inferred location of destination, wherein the GPS pings of the filter trajectory is obtained from the remaining GPS pings of the each of the historical trajectories which lie outside the threshold distance away from its location of origin and its location of destination.

20. The system according to claim 18, wherein the system is further caused to:

for each of the filtered trajectories, convert the time-ordered sequence of GPS pings to the ground truth route in the training data set.

21. The system according to claim 17, wherein the system is further caused to:
aggregate the raw GPS data of the historical trajectories to determine a historical speed for each road class in the map so as to construct the speed profile, and
build a road network based on the speed profile and the map.

22. The system according to claim 13, wherein when calculating of the offcourse ratio for each suggested route, the system is caused to compute the following equation:

OffcourseRatio($\hat{P}$,P)=1−Sim($\hat{P}$,P), wherein P is the suggested route, $\hat{P}$ is the corresponding ground truth route, and Sim($\hat{P}$,P) is a similarity score between the suggested route and the corresponding ground truth route, wherein $$\text{Sim}(\hat{P}, P) = \frac{\text{SequentialOverlap}(\hat{P}, P)}{\sum_{\hat{e} \in \hat{P}} len(\hat{e})},$$

wherein $\hat{e}$ denotes each road segment in the corresponding ground truth route, len($\hat{e}$) denotes each road segment's length in the corresponding ground truth route, and SequentialOverlap($\hat{P}$,P) is the combined length of road segments in the suggested route that are matched to the corresponding road segments in the corresponding ground truth route.

23. The system according to claim 22, wherein the system is further caused to:
search for the road segments in the ground truth route that are matched to the corresponding road segments in the suggested route,
wherein when searching for the road segments, the system is configured to:
sequentially conduct a search for a matching road segment in the ground truth route for each road segment in the suggested route,
wherein during each iteration of search, start the search in the ground truth route from a road segment that is placed subsequent to a last matched road segment in the ground truth route.

\* \* \* \* \*